United States Patent
Saito et al.

(10) Patent No.: US 12,442,487 B2
(45) Date of Patent: Oct. 14, 2025

(54) FIXING DEVICE AND FIXING STRUCTURE FOR ARTICLE ATTACHING MEMBER

(71) Applicant: DANDORI VIS CO., LTD., Tokyo (JP)

(72) Inventors: Kenji Saito, Tokyo (JP); Kyohei Kaneda, Tokyo (JP)

(73) Assignee: DANDORI VIS CO., LTD., Tokyo (JP)

( * ) Notice: Subject to any disclaimer, the term of this patent is extended or adjusted under 35 U.S.C. 154(b) by 0 days.

(21) Appl. No.: 18/575,525

(22) PCT Filed: Dec. 22, 2022

(86) PCT No.: PCT/JP2022/047408
§ 371 (c)(1),
(2) Date: Dec. 29, 2023

(87) PCT Pub. No.: WO2023/238427
PCT Pub. Date: Dec. 14, 2023

(65) Prior Publication Data
US 2024/0295287 A1 Sep. 5, 2024

(30) Foreign Application Priority Data
Jun. 9, 2022 (JP) ................................ 2022-094022

(51) Int. Cl.
*F16M 13/02* (2006.01)
*A47G 1/06* (2006.01)
(Continued)

(52) U.S. Cl.
CPC .......... *F16M 13/02* (2013.01); *A47G 1/0638* (2013.01); *A47G 1/16* (2013.01); *A47G 1/215* (2013.01); *A47G 1/22* (2013.01); *A47G 29/00* (2013.01)

(58) Field of Classification Search
CPC .......... A47G 1/10; A47G 1/0638; A47G 1/22; A47G 1/1606; A47G 1/16; A47G 1/215; A47G 29/00; F16M 13/02
(Continued)

(56) References Cited

U.S. PATENT DOCUMENTS 1,752,297 A * 4/1930 Gillette .................. A47G 1/215
40/761
2,204,862 A * 6/1940 Lehman ................. A47G 1/215
40/785
(Continued)

FOREIGN PATENT DOCUMENTS

BR 202020002761 U2 * 8/2021 ............... A47G 1/16
FR 693498 A 11/1930
(Continued)

OTHER PUBLICATIONS

International Search Report dated Feb. 7, 2023, issued in counterpart International Application No. PCT/JP2022/047408, w/English Translation. (7 pages).
(Continued)

*Primary Examiner* — Taylor Morris
(74) *Attorney, Agent, or Firm* — WHDA, LLP

(57) ABSTRACT

A fixing device for an article attaching member that makes it possible to fix with sufficient strength an article attaching member, to which a desired article or articles is/are capable of being attached, to a fragile wall surface made of gypsum board or the like by easy work, is provided.
In a state where a first engaging portion 14 and a second engaging portion 15 are contacted with a wall surface 50*a*, nails 20 inserted respectively through guide holes 14*a* and 15*a* of the first and second engaging portions 14 and 15 are pushed into the wall surface 50*a*, thereby engaging the first and second engaging portions 14 and 15 with the wall surface 50*a*. An engaged portion 41 of an article attaching
(Continued)

member 40 is inserted into a space S formed by an engagement wall 11 and the first and second side walls 12 and 13, and the engaged portion 41 of the member 40 received in the space S is engaged with the engagement wall 11, thereby fixing the member 40 to the wall surface 50a at a desired location. It is preferred that the engaged portion 41 and the engagement wall 11 are connected together using a connecting means (for example, a screw member, a nail or pin, a glue, an adhesive, a magnet, etc.).

11 Claims, 24 Drawing Sheets

(51) Int. Cl.
    *A47G 1/16*      (2006.01)
    *A47G 1/21*      (2006.01)
    *A47G 1/22*      (2006.01)
    *A47G 29/00*      (2006.01)

(58) Field of Classification Search
    USPC ........................................................ 248/200
    See application file for complete search history.

(56) References Cited

U.S. PATENT DOCUMENTS

| | | | | |
|---|---|---|---|---|
| 2,268,681 A * | 1/1942 | Vernon | ................... | G09F 23/00 |
| | | | | 52/657 |
| 4,179,089 A | 12/1979 | Parr, Jr. | | |
| 4,268,000 A * | 5/1981 | Ulm | .......................... | B44C 5/02 |
| | | | | 24/304 |
| 4,673,152 A * | 6/1987 | Brown | ................... | A47G 1/215 |
| | | | | 248/216.1 |
| 4,795,294 A * | 1/1989 | Takada | ..................... | A47G 1/22 |
| | | | | 248/547 |
| 5,346,169 A * | 9/1994 | Polonsky | ................. | A47G 1/20 |
| | | | | 248/225.11 |
| D364,331 S * | 11/1995 | Leek | .............................. | D8/354 |
| 5,464,185 A | 11/1995 | Hensley | | |
| 5,542,641 A * | 8/1996 | Donovan | ............. | A47G 1/1633 |
| | | | | 248/262 |
| 5,768,833 A * | 6/1998 | Golen | ....................... | E06B 9/02 |
| | | | | 52/203 |
| 5,799,429 A * | 9/1998 | Speshyock | ........... | A47G 1/0638 |
| | | | | 40/778 |
| 5,947,437 A * | 9/1999 | Tate | ..................... | A47G 1/0638 |
| | | | | 248/467 |
| 7,481,406 B2 * | 1/2009 | Lang | ..................... | A47F 5/0815 |
| | | | | 248/220.42 |
| 7,891,124 B1 * | 2/2011 | Willis | .................. | A47G 1/1606 |
| | | | | 52/235 |
| 9,743,785 B2 * | 8/2017 | Crawford | ............. | A47G 1/0633 |
| 9,826,845 B2 * | 11/2017 | Krake | .................. | A47G 1/1633 |
| 10,098,483 B2 * | 10/2018 | Krake | .................. | A47G 1/1633 |
| 10,117,531 B1 * | 11/2018 | Hoban | ................. | A47G 1/0638 |
| 11,181,225 B2 * | 11/2021 | Kawaguchi | .......... | F16M 11/041 |
| 2001/0045042 A1 * | 11/2001 | Dowzall | .............. | A47G 1/0611 |
| | | | | 40/790 |
| 2002/0046536 A1 * | 4/2002 | Hotta | .................. | E04F 13/0864 |
| | | | | 52/698 |
| 2004/0216345 A1 * | 11/2004 | Wadusky | ............... | A47G 1/215 |
| | | | | 40/768 |
| 2005/0035264 A1 * | 2/2005 | Marks | ...................... | A47G 1/22 |
| | | | | 248/217.2 |
| 2008/0098664 A1 * | 5/2008 | McGregor | ............. | A47G 1/215 |
| | | | | 248/231.91 |
| 2008/0251682 A1 * | 10/2008 | Repac | .................. | F16B 45/008 |
| | | | | 248/304 |
| 2010/0051769 A1 * | 3/2010 | Tyson | .................. | A47F 5/0807 |
| | | | | 248/220.31 |
| 2016/0235224 A1 * | 8/2016 | Yang | ......................... | A47G 1/20 |
| 2018/0035829 A1 * | 2/2018 | Soto | .......................... | A47G 1/21 |
| 2025/0075848 A1 * | 3/2025 | Saito | ...................... | A47G 29/00 |

FOREIGN PATENT DOCUMENTS

| | | | | |
|---|---|---|---|---|
| FR | 2691107 A1 * | 11/1993 | ............. | A47G 1/215 |
| GB | 2245829 A * | 1/1992 | ........... | A47G 1/0605 |
| JP | 50-19795 U | 3/1975 | | |
| JP | 59-15374 U | 1/1984 | | |
| JP | 63-6215 U | 1/1988 | | |
| JP | 3036649 U | 5/1997 | | |
| JP | 2002-168210 A | 6/2002 | | |
| JP | 2007-50150 A | 3/2007 | | |
| JP | 3132092 U | 5/2007 | | |
| WO | WO-8906104 A1 * | 7/1989 | ............... | A47G 1/22 |

OTHER PUBLICATIONS

Written Opinion of the International Searching Authority (Form PCT/ISA/237) dated Feb. 7, 2023, issued in counterpart International Application No. PCT/JP2022/047408. (4 pages).

Office Action dated Dec. 22, 2022, issued in counterpart of Japanese Patent Application No. 2022-094022, with English Translation. (6 pages).

* cited by examiner

VIEWS SHOWING FIXING STATE OF FIXING MEMBER
FOR HOOK (ARTICLE TO BE ATTACHED) USED IN TEST

GRAPH SHOWING TEST RESULTS OF FIXING DEVICE ACCORDING TO EMBODIMENT OF THE PRESENT INVENTION AND COMPARATIVE EXAMPLE

FIG. 22

TEST RSULTS OF FIXING DEVICE ACCORDING TO EMBODIMENT
OF THE PRESENT INVENTION AND COMPARATIVE EXAMPLE

| TEST MATERIAL | | MAXIMUM LOAD (N) | MAXIMUM DISPLACEMENT (mm) | TEST RESULTS |
|---|---|---|---|---|
| INVENTION | SAMPLE 1 | 444.26 | 8.87 | ● No abnormality was observed in the fixing device according to the invention.<br>● No rattling and no displacement occurred in the article attaching member also which was fixed to the wall surface made of the gypsum board using the fixing device according to the invention.<br>● The hook fixed to trhe article attaching member was broken. This breakage was caused by breakage of the fixing member for the hook.<br>● The fixing member did not come off becuase it was fixed to the article attaching memer using the tapping screws not pins. However, the hook itself was broken instead. |
| | SAMPLE 2 | 488.45 | 8.05 | same as above |
| | SAMPLE 3 | 498.88 | 7.65 | same as above |
| COMPARA-TIVE EXAMPLE | SAMPLE 1 | 80.80 | 4.32 | ● The pins were dropped off from the wall surface made of the gypsum board because the fixing member for the hook was fixed to the wall surface using the pins. As a result, the hook itself was also dropped off. |
| | SAMPLE 2 | 65.93 | 6.77 | same as above |
| | SAMPLE 3 | 74.85 | 5.47 | same as above |

VIEW SHOWING ARTICLE ATTACHNIG MEMBER
TO BE FIXED BY FIXING DEVICE
ACCORDING TO EMBODIMENT OF THE PRESENT INVENTION

VIEWS SHOWING OTHER EXAMPLES OF ARTICLE ATTACHNIG MEMBER TO BE FIXED BY FIXING DEVICE ACCORDING TO EMBODIMENT OF THE PRESENT INVENTION

FIXING DEVICE AND FIXING STRUCTURE FOR ARTICLE ATTACHING MEMBER

TECHNICAL FIELD

The present invention relates to a fixing device and a fixing structure for an article attaching member and more particularly, to a fixing device for an article attaching member that makes it possible to realize by easy work attachment of an article or articles using screws, nails, magnetic force, etc. to a wall surface (for example, a wall surface made of gypsum board or the like) (hereinafter also referred to as a fragile wall surface) to which it is difficult to attach an article or articles using screws or nails; and a fixing structure for an article attaching member using the fixing device.

BACKGROUND ART

Gypsum board is a board-shaped construction material made of "gypsum", a mineral made of calcium sulfate and water, as a core material, both surfaces and side faces of which are wrapped with base paper. Gypsum board is widely used as a base material for interior walls, ceilings, etc. at all kinds of construction sites including homes, office buildings, commercial facilities, hotels, and hospitals.

Gypsum board has the characteristic that even when nails or screws are driven into it, they quickly come off, and the gypsum itself crumbles. Therefore, when fixing a desired article (for example, a hook, a hanger, etc.) to a wall surface made of gypsum board, it is necessary to securely attach it using, for example, "gypsum board anchors". However, the use of "gypsum board anchors'" is often undesirable because it creates large holes in the wall surface and these holes are difficult to be repaired.

Therefore, devised tools that make it possible to fix an article such as a hook and a hanger to a wall face made of gypsum board without using "gypsum board anchors" have been developed and proposed.

For example, in Patent Literature 1 (Microfilm of Japanese Utility Model Application No. 61/099,031 (Japanese Utility Model Application Publication No. 63-006215)), an article attaching device is disclosed This article attaching device comprises a main body having a plurality of (for example, three) through holes which are formed in directions obliquely converging with each other from symmetrical sites on a head part thereof to the vicinity of the center of a bottom surface, and a mounting part formed on the head part of the main body. With the mounting part, for example, a cylindrical protrusion having a female screw hole is formed, a female screw hole is formed, or a male screw piece is fixed. The article attaching device is configured in such a way as to be fixed (attached) to a wall surface made of gypsum board by respectively inserting fixing pieces such as nails and screws through the plurality of through holes in the state where the bottom surface is pressed against the wall surface made of gypsum board. Various articles such as hooks, clocks, racks, etc. can be attached to the mounting part according to the necessity.

With the above-mentioned article attaching device of Patent Literature 1, the fixing pieces such as nails and screws which are respectively inserted through the plurality of through holes are pushed into the wall surface along the plurality of through holes, that is, in the directions obliquely converging with each other from the symmetrical sites of the head part to the vicinity of the center of the bottom surface. Therefore, the article attaching device can be fixed (attached) to the wall surface with sufficient strength to hold an article such as a hook, clock, rack, etc. (See Pages 4 to 8 and FIGS. 1 to 7).

As understood from the above description, it can be said that the article attaching device of Patent Literature 1 mentioned above is a device that makes it possible to attach a various article such as a hook, clock, and rack to the device itself (specifically, the head part of the device) and that is configured to be fixed (attached) to the wall surface made of gypsum board by driving the fixing pieces such as nails and screws in the directions obliquely converging with each other.

Furthermore, in Patent Literature 2 (Japanese Patent Application Publication No. 2002-168210), an article fixing structure is disclosed. With this article fixing structure, a plurality of (for example, five) directional guide holes are formed in a bowl-shaped recess, which is formed on the surface of a base body, so as to penetrate obliquely from the inner circumferential slope of the recess toward the back side of the base body, nails inserted respectively into the guide holes are set so as to expand radially in all directions on the back side of the base body, and a cap for holding down the heads of the respective nails thus inserted is configured to be fitted into the recess. The cap, which is removably fitted into the recess, can prevent the nails inserted into the guide holes from coming out. When fixing an object to be fixed, it is sufficient that a facing part formed on the back side of the base body is inserted into an attaching hole of the object, the facing part is put against the wall surface, and nails are respectively inserted and driven into the guide holes. The object is fixed in such a way as to be sandwiched between the base body and the wall surface.

In addition, a through hole for a wood screw is formed at the center of the inner bottom of the recess. In the case where a crosspiece is placed on the back side of the gypsum board, the base body is fixed by inserting a wood screw through the through hole, thereby making it possible to further reinforce the fixing strength given by the nails.

With the above-mentioned article fixing structure of Patent Literature 2, since the plurality of directional guide holes that penetrate obliquely from the inner circumferential slope of the recess toward the back side of the base body are formed in the recess of the base body, the nails inserted respectively into the guide holes spread radially in all directions to penetrate into the wall surface over a wide area. As a result, an article (the object to be fixed) such as a shelf, hook, handrail, and towel rack can be fixed to a soft wall surface made of gypsum board, thin plywood, or the like with higher strength than the conventional products (in which a plurality of nails are placed closely to each other so as to converge to the vicinity of the center of the bottom surface of a main body). (see Paragraphs 0001, 0004 to 0011, and FIGS. 1 to 9).

As can be understood from the above, with the aforementioned article fixing structure of Patent Literature 2, the fixing strength of the base body is increased by placing the plurality of nails so as to spread radially in all directions on the back side of the base body, that is, on the inside of the wall surface (the inside of the gypsum board). Therefore, the article fixing structure of Patent Literature 2 is common to the aforementioned article attaching device of Patent Literature 1 in this point. However, the article fixing structure of Patent Literature 2 is different form the article attaching device of Patent Literature 1 in the point that the article (the object to be fixed) such as a shelf, hook, handrail, and towel rack is not designed to be attached to the base body itself, but the article is designed to be sandwiched between the base body and the wall surface made of gypsum board.

PRIOR ART LITERATURE

Patent Literature

Patent Literature 1: Microfilm of Japanese Utility Model Application No. 61/099,031 (Japanese Utility Model Application Publication No. 63-006215)
Patent Literature 2: Japanese Patent Application Publication No. 2002-168210

SUMMARY OF THE INVENTION

Problems to be Resolved by the Invention

By the way, with the aforementioned article attaching device of Patent Literature 1, various articles are designed to be attachable to the said device itself (specifically, the head part of the said device), and the said device is configured to be fixed to the wall surface made of gypsum board by driving the plurality of fixing pieces such as nails and screws in the directions obliquely converging with each other; therefore, the said device can be fixed to the wall surface with sufficient strength. However, the main body is formed, for example, approximately cylindrical, and the female screw hole or the female screw hole part is formed in the mounting part of the head part, or the male screw piece is fixed to the said mounting part. Moreover, the article is designed to be held on the mounting part using the female screw hole, the female screw hole part, or the male screw piece. Accordingly, there is a disadvantage that the article that can be attached (fixed) to the wall surface using the said article attaching device is limited to an article that can be held on the mounting part using a female screw hole, a female screw hole part, or a male screw piece, or something similar thereto.

With the aforementioned article fixing structure of Patent Literature 2, since the plurality of directional guide holes that penetrate obliquely from the inner circumferential slope of the recess toward the back side of the base body are formed in the recess of the base body, the nails inserted respectively into the plurality of guide holes are designed to spread radially in all directions to penetrate into the wall surface over a wide area. For this reason, an article (the object to be fixed) such as a shelf, hook, handrail, and towel rack can be fixed to the wall surface made of gypsum board with higher strength than the conventional structures (in which a plurality of nails are designed to be placed closely to each other so as to converge to the vicinity of the center of the bottom surface of a conical or pyramidal main body). However, the base body has a disc-like shape with the bowl-shaped recess formed on the spherical surface, and various articles are designed to be fixed so as to be sandwiched between the base body and the wall surface made of gypsum board. Accordingly, there is a disadvantage that the article that can be fixed to the wall surface using the said article fixing structure is limited to an article that can be held to be sandwiched between the base body and the wall surface.

Furthermore, with the aforementioned article fixing structure of Patent Literature 2, there is another disadvantage that when trying to fix two or more articles to the wall surface, it is necessary to install the same number of the said article fixing structures as that of the said articles on the wall surface.

Furthermore, with both of the aforementioned article attaching device of Patent Literature 1 and the aforementioned article fixing structure of Patent Literature 2, the idea behind them is that "a desired article is attached or fixed to a desired location on a wall face made of gypsum board using the article attaching device or the base body itself". Therefore, there is a further disadvantage that the article that can be attached or fixed is limited to those having a size, shape, configuration, or weight that allow attachment or fixation to the wall surface using the article attaching device or the base body itself.

The present invention was created while taking the aforementioned circumstances into consideration and its object is to provide a fixing device for an article attaching member that makes it possible to fix an article attaching member, to which a desired article or articles is/are attachable, to a fragile wall surface made of gypsum board or the like with sufficient strength by easy work; and a fixing structure for an article attaching member using the fixing device.

Another object of the present invention is to provide a fixing device for an article attaching member that makes it possible to attach a desired article or articles to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used; and a fixing structure for an article attaching member using the fixing device.

Still another object of the present invention is to provide a fixing device for an article attaching member that makes it possible to significantly expand both the types and number of articles that can be attached to a fragile wall surface made of gypsum board or the like than before; and a fixing structure for an article attaching member using the fixing device.

A further object of the present invention is to provide a fixing device for an article attaching member that makes it possible to provide high convenience not only to users and purchasers of buildings including fragile wall surfaces made of gypsum board or the like but also to builders involved in the construction of this type of buildings; and a fixing structure for an article attaching member using the fixing device.

Other objects of the present invention not specified here will be clarified from the following description and attached drawings.

Means for Solving the Problems (1) A fixing device for an article attaching member according to the present invention is a fixing device configured to be used for fixing an article attaching member, to which a desired article or articles is/are attachable, to a fragile wall surface made of gypsum board or the like, which comprises:
an engagement wall, which is formed to be engaged with a predetermined engaged portion of the article attaching member, having a first connecting portion (for example, the side edge corresponding to the side 11-1 in FIG. 1) and a second connecting portion (for example, the side edge corresponding to the side 11-2 in FIG. 1) extending in mutually different directions;
a first side wall, which is connected to the first connecting portion of the engagement wall, formed to intersect with the engagement wall;

a second side wall, which is connected to the second connecting portion of the engagement wall, formed to intersect with the engagement wall;

a first engaging portion, which is formed at an end of the first side wall on an opposite side to the engagement wall, having guide holes through which nails or pins are inserted to be guided in a predetermined direction; and a second engaging portion, which is formed at an end of the second side wall on an opposite side to the engagement wall, having guide holes through which nails or pins are inserted to be guided in a predetermined direction;

wherein on a side of the engagement wall where the first second engaging portion and the second engaging portion are present, a space capable of receiving the engaged portion of the article attaching member is formed by the engagement wall, the first side wall, and the second side wall;

the first engaging portion is configured to be engaged with the wall surface by inserting nails or pins through the guide holes of the first engaging portion and pushing the nails or pins into the wall surface in a state where the first engaging portion is contact with the wall surface;

the second engaging portion is configured to be engaged with the wall surface by inserting nails or pins through the guide holes of the second engaging portion and pushing the nails or pins into the wall surface in a state where the second engaging portion is contact with the wall surface; and when fixing the article attaching member at a desired position on the wall surface, the first engaging portion is engaged with the wall surface by nails or pins which are inserted through the guide holes of the first engaging portion and pushed into the wall surface, the second engaging portion is engaged with the wall surface by nails or pins which are inserted through the guide holes of the second engaging portion and pushed into the wall surface, and the engagement wall is engaged with the engaged portion of the article attaching member which is received in the space, thereby fixing the article attaching member at the desired position.

With the fixing device for an article attaching member according to the present invention, since the above-described configuration is provided, when nails or pins inserted respectively through the guide holes of the first engaging portion are pushed into the wall surface to thereby engage the first engaging portion to the wall surface in the state where the first engaging portion is contacted with the wall surface, and nails or pins inserted respectively through the guide holes of the second engaging portion are pushed into the wall surface to thereby engage the second engaging portion to the wall surface in the state where the second engaging portion is contacted with the wall surface, the space formed by the engagement wall, the first side wall, and the second side wall is located on the wall surface. The space is capable of receiving the engaged portion of the article attaching member, and the engaged portion of the article attaching member received in the space is adapted to be engaged with the engagement wall.

Therefore, for example, if the engagement wall is engaged with the engaged portion of the article attaching member in the space before engaging the first engaging portion and the second engaging portion with the wall surface in the above-described manner using nails or pins, it is possible to fix the article attaching member to the wall surface at the desired position by simply engaging the first engaging portion and the second engaging portion with the wall surface.

Alternatively, the engagement wall may be engaged with the engaged portion of the article attaching member in the space after the first engaging portion and the second engaging portion are engaged with the wall surface in the above-described manner using nails or pins. Even in this case, it is possible to fix the article attaching member to the wall surface at the desired position by simply engaging the first engaging portion and the second engaging portion with the wall surface.

Further, the first engaging portion and the second engaging portion are formed to be respectively connected to the first connecting portion and the second connecting portion of the engagement wall which extend in mutually different directions and formed to intersect with the engagement wall. Therefore, the nails or pins that have been respectively inserted through the guide holes of the first engaging portion and pushed into the wall surface and the nails or pins that have been respectively inserted through the guide holes of the second engaging portion and pushed into the wall surface are located at positions (regions) apart (displaced) from each other, and these nails or pins are extended in mutually different directions in the inside of the wall surface. For this reason, the fixing device is mechanically supported on the wall surface by the nails or pins extending in the mutually different directions at the mutually distant (displaced) positions (regions). Accordingly, the mechanical strength when the fixing device is fixed to the wall surface is sufficient.

Moreover, what is required to fix the fixing device to the wall surface is the work of engaging the first engaging portion and the second engaging portion to the wall surface in the aforementioned manner using the nails or pins and the work of engaging the engagement wall with the engaged portion of the article attaching member in the space only. Therefore, the work required to fix the fixing device to the wall surface is easy.

As a result, with the fixing device according to the present invention, the article attaching member, to which a desired article or articles is/are attachable, can be fixed to a fragile wall surface made of gypsum board or the like with sufficient mechanical strength by easy work. Regarding this mechanical strength, it has been confirmed by the inventors of the present invention that sufficient mechanical strength to hold the total weight including not only the weight of the article attaching member but also the weight of one or more various articles (articles to be attached) that are assumed to be attached to the article attaching member later can be realized.

Note that it is preferable to use two or more of the fixing devices according to the present invention in combination depending on the shape and number of the engaged portions of the article attaching member. This is because the article attaching member is fixed at two or more places using the two or more of the fixing devices and thus, the article attaching member can be fixed to the wall surface with higher mechanical strength than the case where the only one fixing device is used, which means that the fixing strength of the article attaching member as a whole can be further increased.

In addition to the above-mentioned advantageous effects, the fixing device according to the present invention has the following advantageous effects also.

Specifically, when the fixing device for an article attaching member according to the present invention is used, the article attaching member, to which a desired article or articles is/are attachable, can be fixed to the fragile wall surface made of gypsum board or the like with sufficient mechanical strength and therefore, a desired article or articles can be attached arbitrarily using the article attaching member thus fixed. As a result, with the fixing device according to the present invention, there is another advantageous effect that a desired article or articles can be attached to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used.

Furthermore, when the fixing device according to the present invention is used, the article attaching member, to which a desired article or articles is/are attachable, can be fixed to the fragile wall surface made of the gypsum board or the like with sufficient mechanical strength as described above. Thus, it is possible to attach a desired number of desired articles arbitrarily using the article attaching member which has been fixed in this way. That is, the desired article or articles is/are not directly fixed to the wall surface but is/are fixed to the article attaching member which has been fixed to the wall surface using the fixing device. As a result, by appropriately selecting the shape and/or material of the article attaching member, it is possible to attach a desired article or articles to the wall surface mechanically using screws or nails, or physically using magnetic force or the like. For example, if a wooden board is used as the article attaching member, articles such as hooks and hangers can be attached mechanically using screws or nails. If an iron plate is used as the article attaching member, articles such as hooks and hangers can be attached physically using magnetic force. Furthermore, the number of articles to be attached can be increased up to an allowable value that depends on the size and/or withstand load (the limit of allowable weight) of the article attaching member.

Accordingly, with the fixing device according to the present invention, there is a further advantageous effect that both the types and number of articles that can be attached to a fragile wall surface made of gypsum board or the like can be significantly expanded than before.

Furthermore, when the fixing device according to the present invention is used, the article attaching member, to which a desired article or articles is/are attachable, can be fixed to the fragile wall surface made of gypsum board or the like with sufficient mechanical strength as described above. Thus, it is possible to attach a desired number of desired articles arbitrarily using the article attaching member which has been fixed in this way. This means that convenience of daily life for users and purchasers of buildings including the fragile wall surfaces made of gypsum board or the like is increased dramatically by simple work of purchasing the fixing device and fixing it to the wall surface only.

Additionally, for builders involved in the construction of this type of building, this means that there is an added benefit of "improving the convenience of daily life" for the users and purchasers of this type of building (although some additional cost is required) by simply adding the work of installing the fixing device at an appropriate location on the fragile wall surface made of gypsum board or the like during interior construction. Therefore, regarding buildings including the gypsum board (or similar materials) which has the property of being inexpensive but extremely structurally strong and the high heat and sound insulation properties, builders can appeal to potential customers through advertisements and promotions with the following message: Not only the problem of the gypsum board (and its similar products) that "it is difficult to attach articles using screws or nails" is solved but also the property of high convenience that "you can attach as many desired articles as you like directly to the wall surface, even if you do not use any product that has been devised to enable fixation of an article to the wall surface made of gypsum board" is obtainable. This means that the convenience for builders is high as well.

Accordingly, with the fixing device according to the present invention, there is a still further advantageous effect that high convenience can be provided not only to users and purchasers of buildings including fragile wall surfaces made of gypsum board or the like but also to builders involved in the construction of this type of buildings.

(2) In a preferred embodiment of the fixing device for an article attaching member according to the present invention, a connecting means (for example, a screw member, a nail or pin, a glue, an adhesive, a magnet, and the like) for connecting the engaged portion and the engagement wall together in a state where the engaged portion is received in the space is further provided; and when fixing the article attaching member at the desired position using nails or pins, the engaged portion and the engagement wall are configured to be capable of being connected together by the connecting means.

In this embodiment, the fixing device and the article attaching member can be connected together by connecting the engaging portion and the engagement wall together using the connecting means in the state where the engaged portion is received in the space. Therefore, there is an advantage that the work of fixing the article attaching member to the wall surface using nails or pins, that is, the work of inserting respectively nails or pins through the guide holes of the first engaging portion and pushing the nails or pins into the wall surface in the state where the first engaging portion is contacted with the wall surface, and further inserting respectively nails or pins through the guide holes of the second engaging portion and pushing the nails or pins into the wall surface in the state where the second engaging portion is contacted with the wall surface, is facilitated.

Furthermore, when using two or more of the fixing devices, there is another advantage that the article attaching member can be easily handled by connecting each of the two or more of the fixing devices to a corresponding one of the engaged portions of the article attaching member before fixing the article attaching member to the wall surface using nails or pins.

(3) In another preferred embodiment of the fixing device for an article attaching member according to the present invention, the connecting means for connecting the engaged portion and the engagement wall together is a screw member having a male thread (for example, a wood screw).

In this embodiment, the fixing device can be connected to the engaged portion by simply screwing the screw member into the engaged portion so as to penetrate the engagement wall in the state where the engaged portion is received in the space and therefore, there is an advantage that the work of connecting the engaged portion and the engagement wall together is very simple. In this case, in order to facilitate the work of screwing the screw member into the engaged portion so as to penetrate the engagement wall, it is preferred that a through hole through which the screw member passes be formed in advance in the engagement wall.

(4) In still another preferred embodiment of the fixing device for an article attaching member according to the present invention, the connecting means for connecting the engaged portion and the engagement wall together is a connecting nail or pin.

In this embodiment, the fixing device can be connected to the engaged portion by simply pressing (driving) the connecting nail or pin (which is different from nails or pins for engaging the first engaging portion or the second engaging portion) into the engaged portion so as to pass through the engagement wall in the state where the engaged portion is received in the space and therefore, there is an advantage that the work of connecting the engaged portion and the engagement wall together is very simple. In this case, in order to facilitate the work of pressing the connecting nail or pin into the engaged portion so as to penetrate the engagement wall, it is preferred that a through hole through which the connecting nail or pin passes be formed in advance in the engagement wall.

(5) In a further preferred embodiment of the fixing device for an article attaching member according to the present invention, the connecting means for connecting the engaged portion and the engagement wall together is a glue or adhesive.

In this embodiment, the fixing device can be connected to the engaged portion by simply disposing the glue or adhesive between the engagement wall and the engaged portion in the state where the engaged portion is received in the space and therefore, there is an advantage that the work of connecting the engaged portion and the engagement wall together is very simple.

(6) In a still further preferred embodiment of the fixing device for an article attaching member according to the present invention, the connecting means for connecting the engaged portion and the engagement wall together is a magnet.

In this embodiment, for example, if small magnets are arranged or buried in the engaged portion and the engagement wall, respectively, the fixing device can be connected to the engaged portion by magnetic force in the state where the engaged portion is received in the space and therefore, there is an advantage that the work of connecting the engaged portion and the engagement wall together is very simple (almost unnecessary). It should be noted that when the article attaching member itself is made of iron or at least the engaged portion thereof is made of iron, it is sufficient to simply embed the magnet in the engagement wall, which provides convenience.

(7) In a still further preferred embodiment of the fixing device for an article attaching member according to the present invention, the first side wall and the second side wall of the engagement wall are connected to each other at their opposing edges, a corner portion is formed at a connection location between the first side wall and the second side wall, and the engagement wall has a plate-like shape (preferably an approximately triangular plate-like shape) including the corner;

wherein the engagement wall, the first side wall, and the second side wall are configured to be engageable with the engaged portion in a state where the engaged portion is received in the space. It should be noted that, as long as the engagement wall is configured to be engageable with the engaged portion of the article attaching member that is received in the space, the corner of the corner portion may be chamfered or rounded.

In this embodiment, the first side wall and the second side wall of the engagement wall are connected to each other at their opposing edges, and furthermore, the corner portion is formed at the connection location between the first side wall and the second side wall. Therefore, there is an advantage that the mechanical strength of the engagement wall and thus the fixing device is increased. Furthermore, since the engagement wall, the first side wall, and the second side wall are configured to be engageable with the engaged portion in the state where the engaged portion is received in the space, there is another advantage that the holding strength of the engaged portion by the fixing device is increased.

(8) In a still further preferred embodiment of the fixing device for an article attaching member according to the present invention, the first side wall and the second side wall of the engagement wall are connected to each other at their opposing edges, a corner portion is formed at a connection location between the first side wall and the second side wall, and the engagement wall has a plate-like shape (preferably an approximately triangular plate-like shape) including the corner portion;

wherein the engaged portion is configured to be held on the wall surface such that the engagement wall is in surface contact with the engaged portion in a state where the engaged portion is received in the space.

In this embodiment, since the engaged portion is held on the wall surface such that the engagement wall is in surface contact with the engaged portion in the state where the engaged portion is received in the space, the possibility of stress concentration on the engagement wall is reduced. Therefore, there is an advantage that the mechanical strength of the engaged portion is less likely to decrease over time and that the durability of the fixing device is improved.

(9) In a still further preferred embodiment of the fixing device for an article attaching member according to the present invention, the first engaging portion has a band-like shape formed along the first side wall at the end of the first side wall on the opposite side to the engagement wall;

the guide holes of the first engaging portion are arranged at intervals along the first side wall;

the second engaging portion has a band-like shape formed along the second side wall at the end of the second side wall on the opposite side to the engagement wall; and the guide holes of the second engaging portion are arranged at intervals along the second side wall.

In this embodiment, the nails or pins inserted respectively through the guide holes of the first engaging portion are pressed into the wall surface so as to be arranged in parallel at intervals along the first side wall on the wall surface, and the nails or pins inserted respectively through the guide holes of the second engaging portion are pressed into the wall surface so as to be arranged in parallel at intervals along the second side wall on the wall surface. However, the arrangement direction of the nails or pins related to the first engaging portion and the arrangement direction of the nails or pins related to the second engaging portion are different from each other. For this reason, the fixing device is mechanically supported on the wall surface by the nails or pins that are arranged in the two mutually different directions at two positions (areas) separated (shifted) from each other. Therefore, there is an advantage that the mechanical strength when the fixing device is fixed to the wall surface can be increased with a simple configuration.

(10) In a still further preferred embodiment of the fixing device for an article attaching member according to the present invention, the guide holes of the first engaging portion are inclined toward inside of the first side wall, and tips of nails or pins which are respectively inserted in their entirety through the guide holes of the first engaging portion are located in the inside of the first side wall; and the guide holes of the second engaging portion are inclined toward inside of the second side wall, and tips of nails or pins which are respectively inserted in their entirety through the guide holes of the second engaging portion are located in the inside of the second side wall.

In this embodiment, the tips of the nails or pins which are respectively inserted in their entirety through the guide holes of the first engaging portion, which are inclined toward the inside of the first side wall, are located in the inside of the first side wall; and the tips of the nails or pins which are respectively inserted in their entirety through the guide holes of the second engaging portion, which are inclined toward the inside of the second side wall, are located in the inside of the second side wall. Thus, the nails or pins are more difficult to fall off from the wall surface. Therefore, there is an advantage that the mechanical strength when the fixing device is fixed to the wall surface can be increased with a simple configuration.

(11) A fixing structure for an article attaching member according to the present invention comprises:

the fixing devices for an article attaching member according to the present invention described in any one of (1) to (10) above;

wherein in each of the fixing devices, the first engaging portion, which is in contact with the wall surface, is engaged with the wall surface by nails or pins which are inserted respectively through the guide holes of the first engaging portion and pushed into the wall surface;

the second engaging portion, which is in contact with the wall surface, is engaged with the wall surface by nails or pins which are inserted respectively through the guide holes of the second engaging portion and pushed into the wall surface; and the engagement wall is engaged with a corresponding one of the engaged portions of the article attaching member that is received in the space, whereby the article attaching member is fixed at the desired position.

With the fixing structure for an article attaching member according to the present invention, the fixing devices for an article attaching member according to the present invention described in any one of (1) to (10) above are included. In each of the fixing devices, as explained above, the first engaging portion and the second engaging portion are engaged with the wall surface, and the engagement wall is engaged with the corresponding one of the engaged portions of the article attaching member that is received in the space, whereby the article attaching member is fixed at the desired position. Therefore, for the same reason as mentioned above regarding the fixing device for an article attaching member according to the present invention, the article attaching member, to which a desired article or articles is/are attachable, can be fixed with sufficient mechanical strength to a fragile wall made of gypsum board or the like by easy work. Regarding this mechanical strength, it has been confirmed by the inventors of the present invention that sufficient mechanical strength to hold the total weight including not only the weight of the article attaching member but also the weight of one or more various articles (articles to be attached) that are assumed to be attached to the article attaching member later can be realized.

In addition to the above-mentioned advantageous effects, the fixing structure for an article attaching member according to the present invention has the following advantageous effects also.

Specifically, when the fixing structure for an article attaching member according to the present invention is used, the article attaching member, to which a desired article or articles is/are attachable, can be fixed to the fragile wall surface made of gypsum board or the like with sufficient mechanical strength using the fixing devices as described above and therefore, a desired article or articles can be attached arbitrarily using the article attaching member thus fixed. As a result, with the fixing structure according to the present invention, there is a further advantageous effect that a desired article or articles can be fixed to a fragile wall surface made of gypsum board or the like even if the products such as the aforementioned article attaching device of Patent Literature 1 and the aforementioned article fixing structure of Patent Literature 2, which are devised to enable fixation of an article or articles such as hooks and hangers to a wall surface made of gypsum board without using the "gypsum board anchor", are not used.

Furthermore, when the fixing structure according to the present invention is used, the article attaching member, to which a desired article or articles is/are attachable, can be fixed to the fragile wall surface made of the gypsum board or the like with sufficient mechanical strength using the fixing devices as described above. Thus, it is possible to attach a desired number of desired articles arbitrarily using the article attaching member which has been fixed in this way. That is, the desired article or articles is/are not directly fixed to the wall surface but is/are fixed to the article attaching member which has been fixed to the wall surface using the fixing devices. As a result, by appropriately selecting the shape and/or material of the article attaching member, it is possible to attach a desired article or articles to the wall surface mechanically using screws or nails, or physically using magnetic force or the like. For example, if a wooden board is used as the article attaching member, an article or articles such as hooks and hangers can be attached mechanically using screws or nails. If an iron plate is used as the article attaching member, an article or articles such as hooks and hangers can be attached physically using magnetic force. Furthermore, the number of the articles to be attached can be increased up to an allowable value that depends on the size and/or withstand load (the limit of allowable weight) of the article attaching member.

Accordingly, with the fixing structure according to the present invention, there is a still further advantageous effect that both the types and number of articles that can be attached to a fragile wall surface made of gypsum board or the like can be significantly expanded than before.

Furthermore, when the fixing structure according to the present invention is used, the article attaching member, to which a desired article or articles isa/are attachable, can be fixed to the fragile wall surface made of gypsum board or the like with sufficient mechanical strength as described above. Thus, it is possible to attach a desired number of desired articles arbitrarily using the article attaching member which has been fixed in this way. This means that convenience of daily life for users and purchasers of buildings including the fragile wall surfaces made of gypsum board or the like is increased dramatically by simple work of purchasing the fixing devices and fixing them to the wall surface only.

Additionally, for builders involved in the construction of this type of building, this means that there is an added benefit of "improving the convenience of daily life" for the users and purchasers of this type of building (although some additional cost is required) by simply adding the work of installing the fixing devices at appropriate locations on the fragile wall surface made of gypsum board or the like during interior construction. Therefore, regarding buildings including the gypsum board (or similar materials) which has the property of being inexpensive but extremely structurally strong and the high heat and sound insulation properties, builders can appeal to potential customers through advertisements and promotions with the following message: Not only the problem of the gypsum board (and its similar products) that "it is difficult to attach articles using screws or nails" is solved but also the property of high convenience that "you can attach as many desired articles as you like directly to the wall surface, even if you do not use any product that has been devised to enable fixation of an article or articles to the wall surface made of gypsum board" is obtainable. This means that the convenience for builders is high as well.

Accordingly, with the fixing structure according to the present invention, there is a still further advantageous effect that high convenience can be provided not only to users and purchasers of buildings including fragile wall surfaces made of gypsum board or the like but also to builders involved in the construction of this type of buildings.

(12) In a preferred embodiment of the fixing structure for an article attaching member according to the present invention, the article attaching member is a plate-like member made of wood, iron, or synthetic resin.

In this embodiment, when the article attaching member is formed by a wooden plate-like member, one or more desired articles (for example, hooks, hangers, etc.) can be attached to the article attaching member mechanically using pins or nails; when the article attaching member is formed by an iron plate-like member, one or more desired articles can be attached to the article attaching member physically using magnetic force; and when the article attaching member is formed by a plate-like member made of synthetic resin, one or more desired articles can be attached to the article attaching member physically using an adhesive. Therefore, there is an advantage that it is possible to freely attach one or more desired articles (for example, hooks, hangers, etc.) in the same manner as the case where the wall face is made of wood or iron, even though the wall face is actually made of gypsum board.

(13) In the present invention, the material of the "fixing device" can be set arbitrarily as long as it provides a rigidity that can realize sufficient mechanical strength to support the total weight including not only the weight of the article attaching member but also the weight of one or more various articles (articles to be attached) that are assumed to be attached to the article attaching member later. For example, it is preferable to use ABS resin which is excellent in terms of rigidity, impact resistance, and ease of processing, or a synthetic resin that has physical properties similar to ABS resin. However, it is not limited to these materials. Synthetic resins other than these materials can also be used, and metal materials can also be used.

In the present invention, the "article attaching member" means a member to which a desired article or articles (hereinafter also referred to as an article or articles to be attached) is attached, and its shape and material are arbitrary. The desired article or articles may be directly attached to the "article attaching member" using pins, nails, magnetic force, etc., or indirectly attached to the "article attaching member" via an appropriate member or device. However, the desired article or articles may be attached by any method.

Taking the fact that the "article attaching member" is fixed to the wall surface into consideration, the "article attaching member" is usually plate-shaped or approximately plate-shaped; however, it is not limited to a plate-like shape or an approximately plate-like shape. It goes without saying that any shape other than a plate-like shape may be used depending on a desired location on the wall surface to which the "article attaching member" is fixed.

The material of the "article attaching member" is preferably a plate-like member made of wood or iron. This is because a desired article or articles is/are often mechanically attached to the wall surface using pins or nails, and if this point is considered important, it is preferable to use a wooden member. Furthermore, this is also because a desired article or articles are often physically attached to the wall surface using magnetic force, and if this point is considered important, it is preferable to use an iron member.

In the present invention, the "article" to be attached to the "article attaching member" is any article that is often attached to the wall surface. For example, many articles such as hooks, hangers, racks, clocks, handrails, towel racks, etc. are used as the "article". The "article" may be directly attached to the "article attaching member" using screws or nails or may be attached thereto via some kind of device that facilitates attachment of the article.

Advantageous Effects of the Invention

With the fixing device for an article attaching member of the present invention and the fixing structure for an article attaching member using the fixing devices, there are the advantageous effects that (a) an article attaching member, to which a desired article or articles is/are attachable, can be fixed to a fragile wall surface made of gypsum board or the like with sufficient mechanical strength by easy work; (b) a desired article or articles can be fixed to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used: (c) both the types and number of articles that can be attached to a fragile wall surface made of gypsum board or the like can be significantly expanded than before; and (d) high convenience can be provided not only to users and purchasers of buildings including fragile walls made of gypsum board or the like but also to builders involved in the construction of this type of buildings.

BRIEF DESCRIPTION OF THE DRAWINGS

FIG. 22 is a table showing the test results of the efficacy confirmation tests of the fixing device for an article attaching member shown in FIGS. 1 to 6 and the comparative example.

EMBODIMENTS FOR CARRYING OUT THE INVENTION

Figure 1:
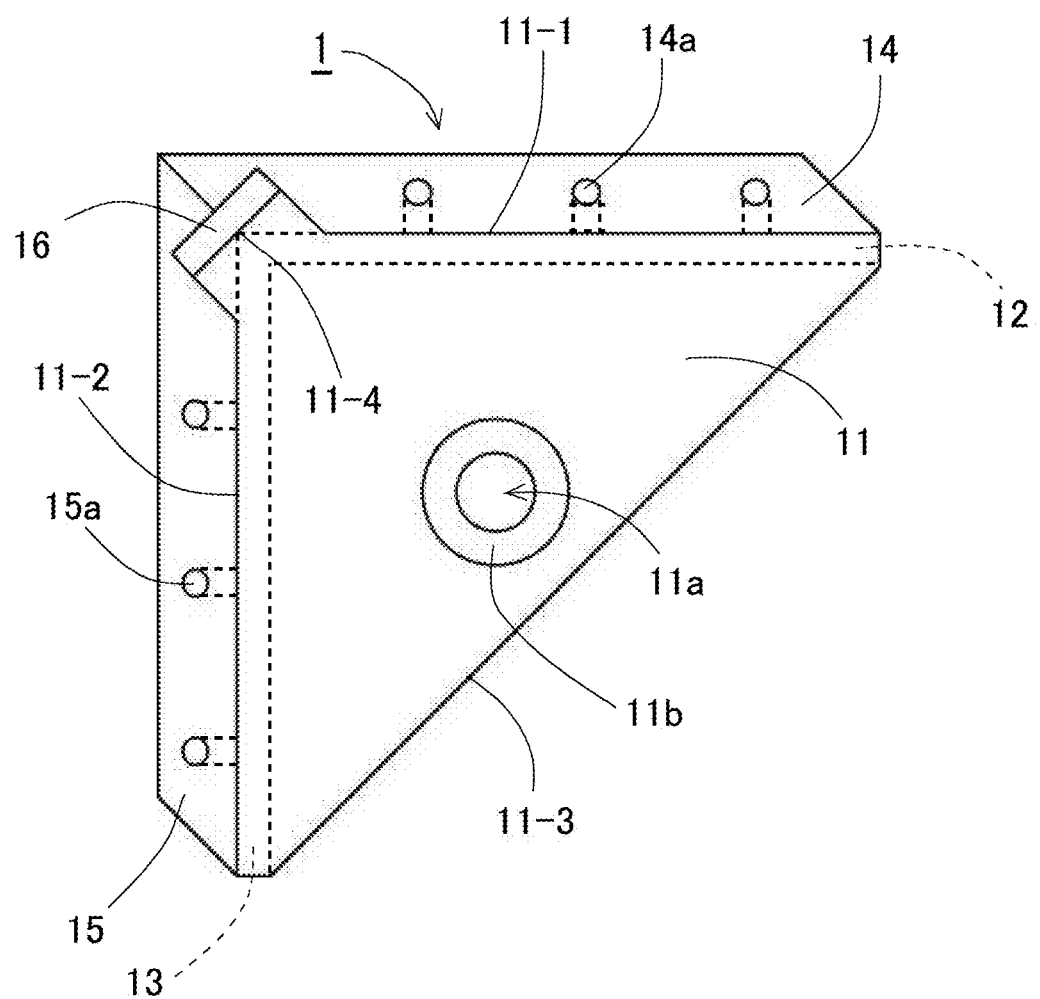
FIG. 1 is a front view of a fixing device for an article attaching member according to an embodiment of the present invention.
Figure 2:
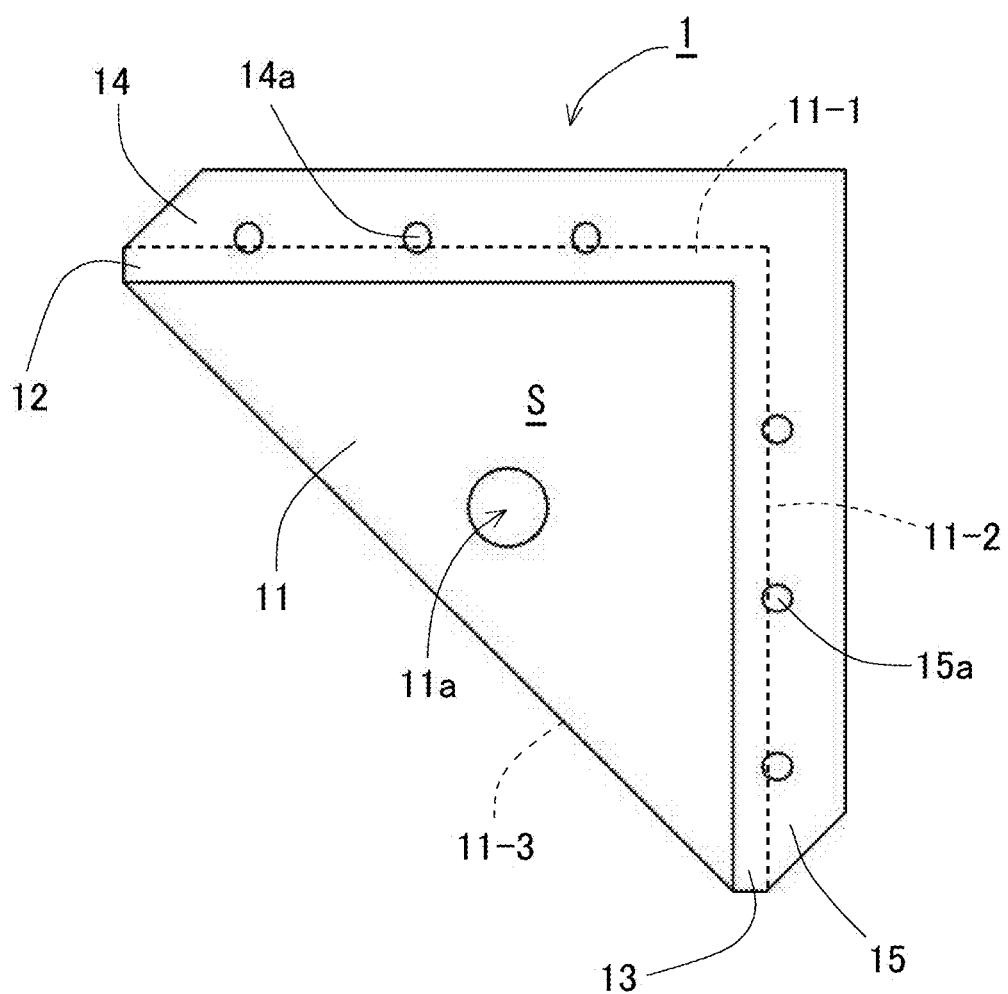
FIG. 2 is a rear view of the fixing device for an article attaching member shown in FIG. 1.
Figure 3:
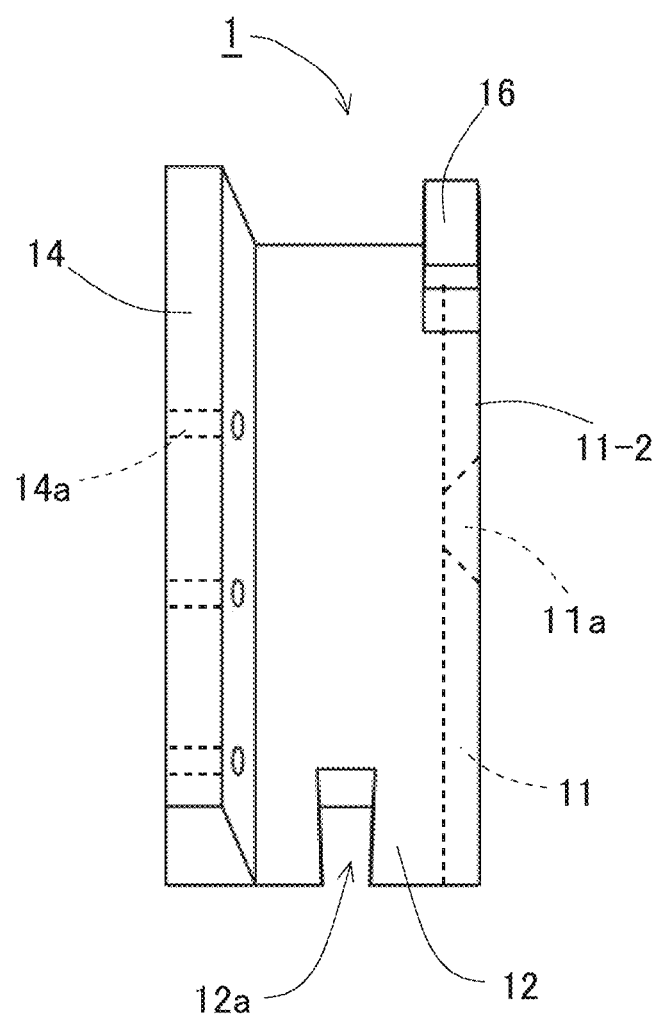
FIG. 3 is a left side view of the fixing device for an article attaching member shown in FIG. 1.
Figure 4:
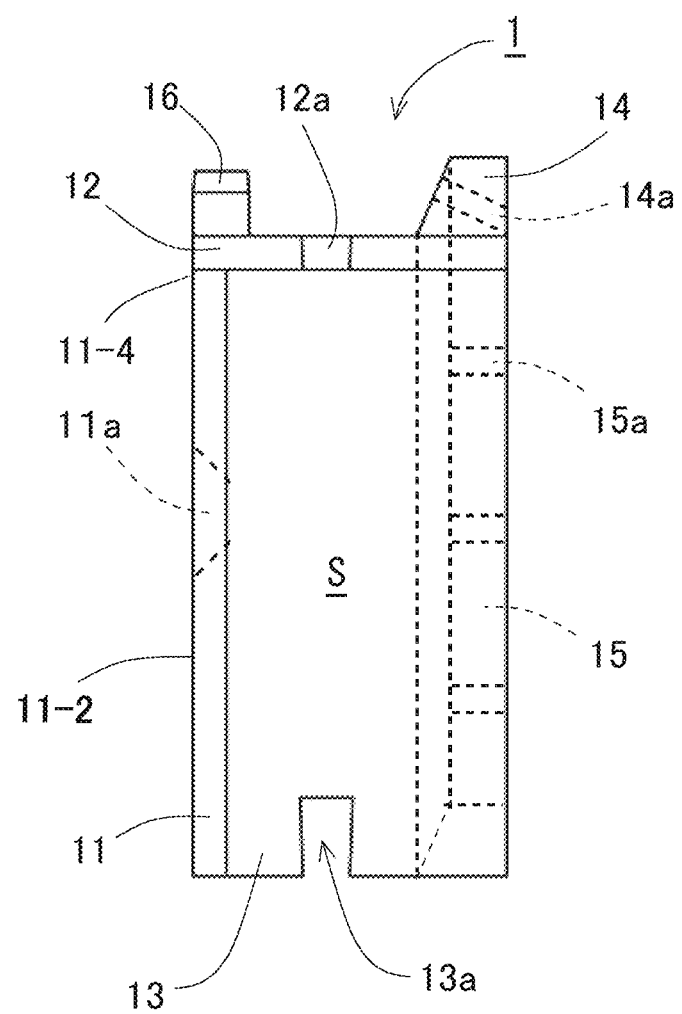
FIG. 4 is a right side view of the fixing device for an article attaching member shown in FIG. 1.
Figure 5:
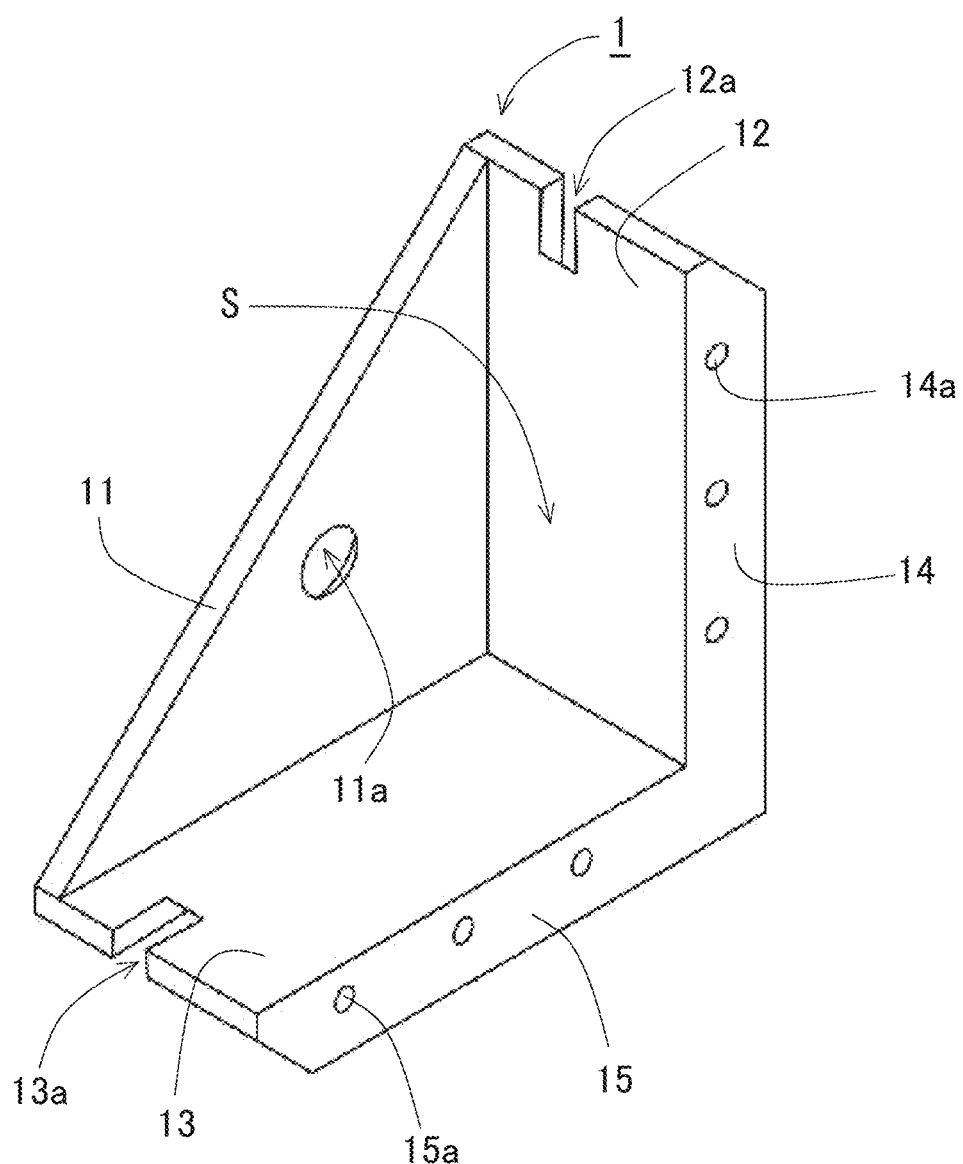
FIG. 5 is a perspective view of the fixing device for an article attaching member shown in FIG. 1, which shows the internal shape of a space defined by a first side wall, a second side wall, and an engagement wall.
Figure 6:
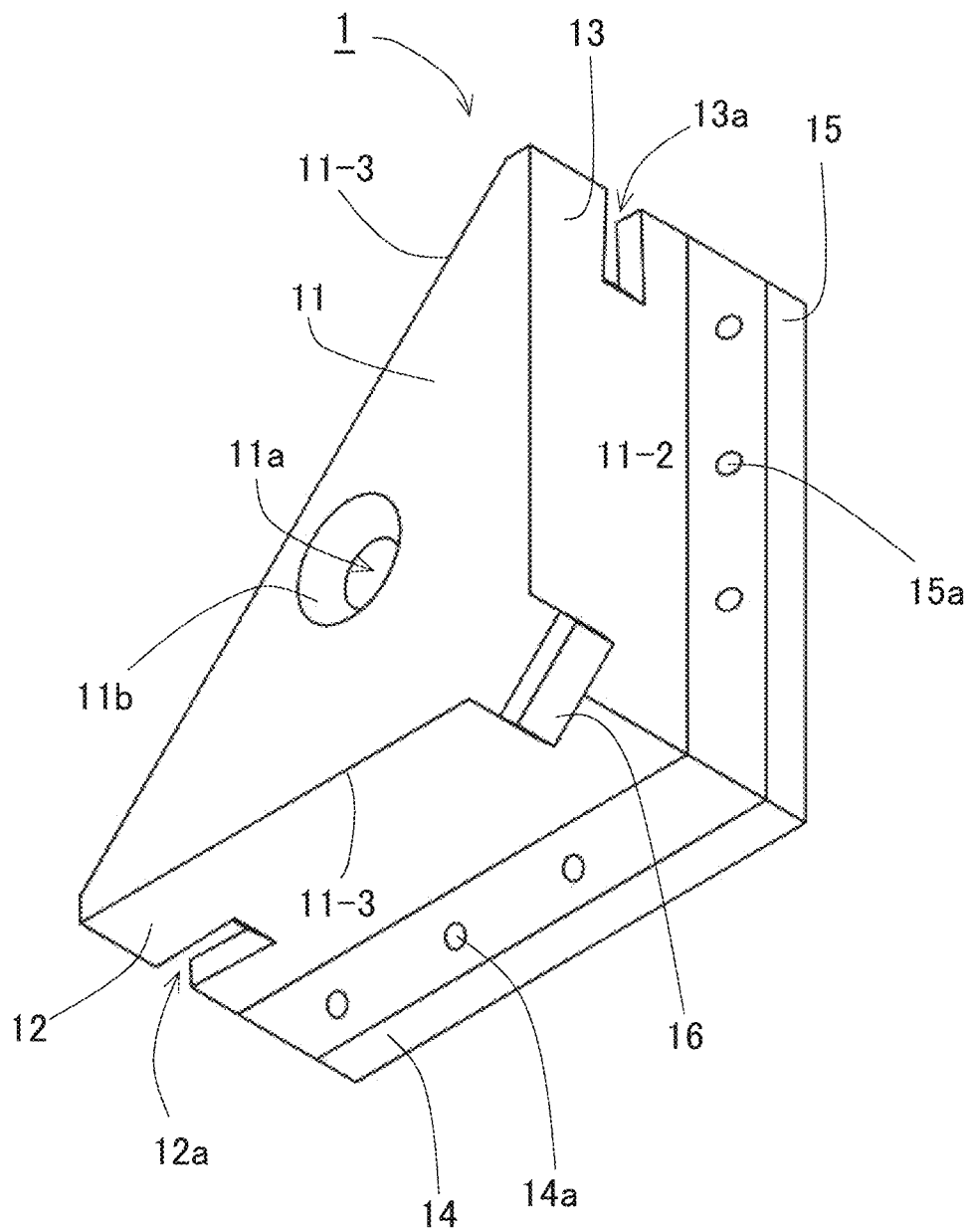
FIG. 6 is a perspective view of the fixing device for an article attaching member shown in FIG. 1, which shows the outer shapes of the first side wall, the second side wall, and the engagement wall.

Hereinafter, preferred embodiments of the present invention will be described with reference to the accompanying drawings.

(Configuration of Fixing Device for Article Attaching Member)

First, the configuration of a fixing device 1 for an article attaching member according to an embodiment of the present invention will be described with reference to the accompanying drawings.

As shown in FIGS. 1 to 6, the fixing device 1 according to the present embodiment has an approximately triangular tubular shape with a cross section of an approximately right-angled isosceles triangle as a whole. This is because the fixing device 1 is intended to fix a rectangular plate-shaped article attaching member 40 (see FIGS. 10 and 23) to a wall surface 50a made of a gypsum board 50 (see FIGS. 9 and 10) by engaging one corner portion of the article attaching member 40 that serves as an engaged portion 41 thereof.

Here, the fixing device 1 is made of a synthetic resin that has physical properties similar to ABS resin (synthetic resin obtained by copolymerizing acrylonitrile, butadiene, and styrene) which has high rigidity and high impact resistance, and which is easy to be processed. However, it is not limited to this resin. It goes without saying that the device 1 can also be produced using another synthetic resin having similar properties (rigidity, impact resistance, ease of processing, etc.) to this resin.

The fixing device 1 according to the present embodiment has a right-angled isosceles triangular plate-shaped engagement wall 11 which is formed on one surface thereof (a front surface, that is, a surface opposite to the wall surface 50a when fixed to the wall surface 50a). There is no engagement wall on the other surface opposite to the engagement wall 11 (a rear surface, that is, a surface on the same side as the wall surface 50a when fixed to the wall surface 50a), and this surface is open to the outside. As shown in FIG. 1, the engagement wall 11 has two equal sides 11-1 and 11-2 that sandwich a right angle 11-4, and an oblique side 11-3 that is opposite to the right angle 11-4.

To a side edge of the engagement wall 11 corresponding to the side 11-1 which is one of the sides that sandwich the right angle 11-4, an end edge of a rectangular plate-shaped first side wall 12 which is closer to the engagement wall 11 is connected. The aforementioned side edge of the engagement wall 11 (the side edge corresponding to the side 11-1 which is one of the sides that sandwich the right angle 11-4) functions as a first connecting portion to which the first side wall 12 is connected. The connection angle between the first side wall 12 and the engagement wall 11 is a right angle. To a side edge of the engagement wall 11 corresponding to the side 11-2 which is the other of the sides that sandwich the right angle 11-4, an end edge of a rectangular plate-shaped second side wall 13 which is closer to the engagement wall 11 is connected. The aforementioned side edge of the engagement wall 11 (the side edge corresponding to the side 11-2 which is the other of the sides that sandwich the right angle 11-4) function as a second connecting portion to which the second side wall 13 is connected. The connection angle between the second side wall 13 and the engagement wall 11 also is a right angle. To a side edge of the engagement wall 11 corresponding to the oblique side 11-3 which is opposite to the right angle 11-4, no side wall is connected, and the said side edge is open to the outside.

The first side wall 12 is perpendicular to the engagement wall 11 and extends along the side edge (the first connecting portion) corresponding to the side 11-1 which is one of the sides that sandwich the right angle 11-4 of the engagement wall 11. The second side wall 13 is perpendicular to the engagement wall 11 and extends along the side edge (the second connecting portion) corresponding to the side 11-2 which is the other of the sides that sandwich the right angle 11-4 of the engagement wall 11. Further, an end edge of the first side wall 12 which is positioned on the same side as the right angle 11-4 of the engagement wall 11 and an end edge of the second side wall 13 which is positioned on the same side as the right angle 11-4 of the engagement wall 11 are connected to each other at the location corresponding to the right angle 11-4. The connection angle between the said end edge of the first side wall 12 and the said end edge of the second side wall 13 is a right angle. In this way, in the area defined by the engagement wall 11, the first side wall 12, and the second side wall 13, an approximately triangular prism-shaped space S having a cross section of a right-angled isosceles triangle is formed.

The size of the space S formed in the fixing device 1 as described above is determined in a manner such that one corner portion (which has a triangular prism shape with a right-angled isosceles triangular cross section) of the article attaching member 40 (see FIG. 23) serving as an engaged portion 41 thereof can be inserted into the space S, and the inserted engaged portion 41 (the aforementioned corner portion) is engaged with and held by the engagement wall 11, the first side wall 12, and the second side wall 13 from three directions. It should be noted that the engaged portion 41 (the aforementioned corner portion) does not necessarily have to be engaged with and held by the engagement wall 11, the first side wall 12, and the second side wall 13 from three directions. Since it is the engagement wall 11 that mainly supports the engaged portion 41 so that it does not fall off the wall surface 50a, it is essential that the engagement wall 11 is engaged with the engaged portion 41 in some way. However, both of the first side wall 12 and the second side wall 13, or either one of the first side wall 12 and the second side wall 13, does not necessarily have to be engaged with the engaged portion 41.

Figure 7:
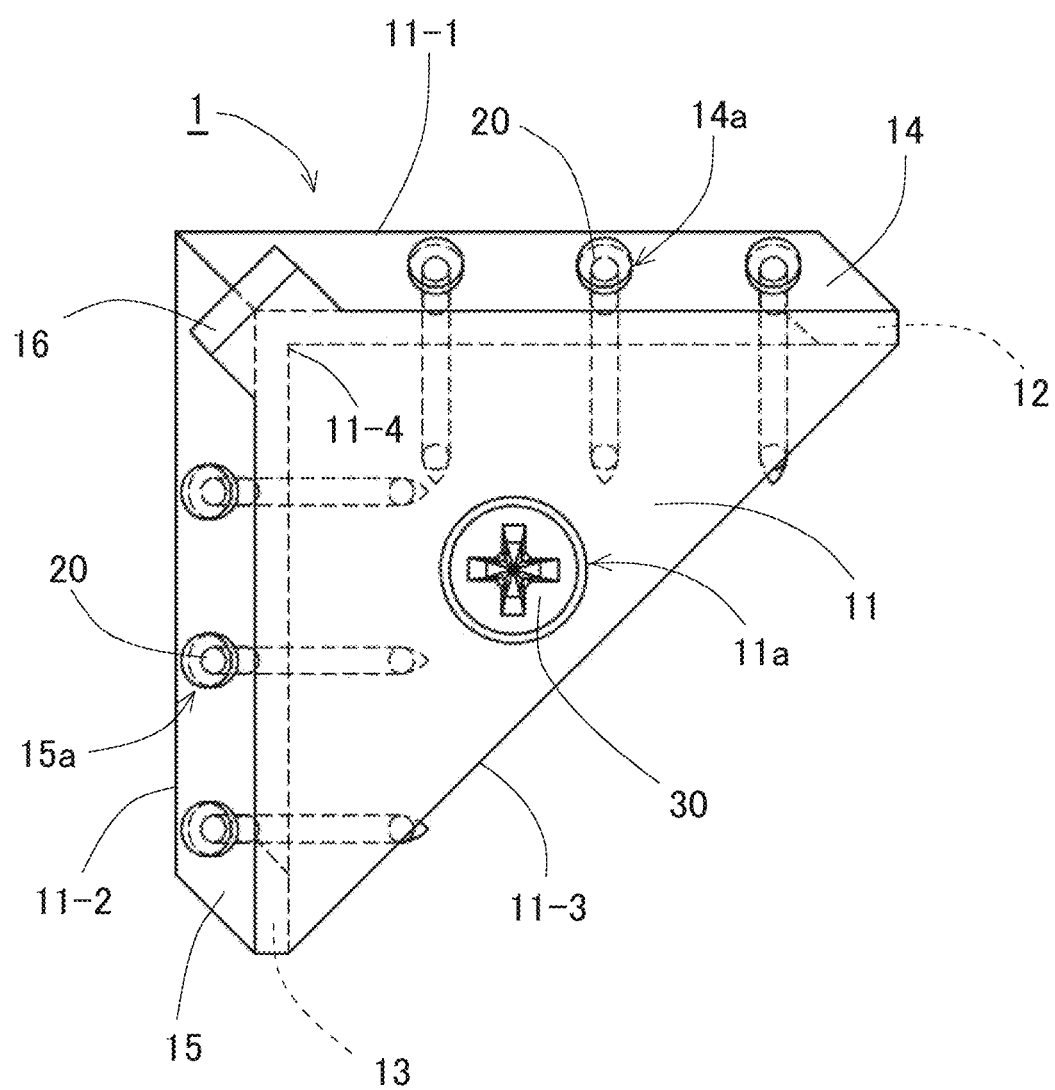
FIG. 7 is a front view showing the state in which the fixing device for an article attaching member shown in FIGS. 1 to 6 is used, in which nails are respectively inserted through guide holes of a first engaging portion and a second engaging portion, and a wood screw is inserted through a through hole of the engagement wall.
Figure 8:
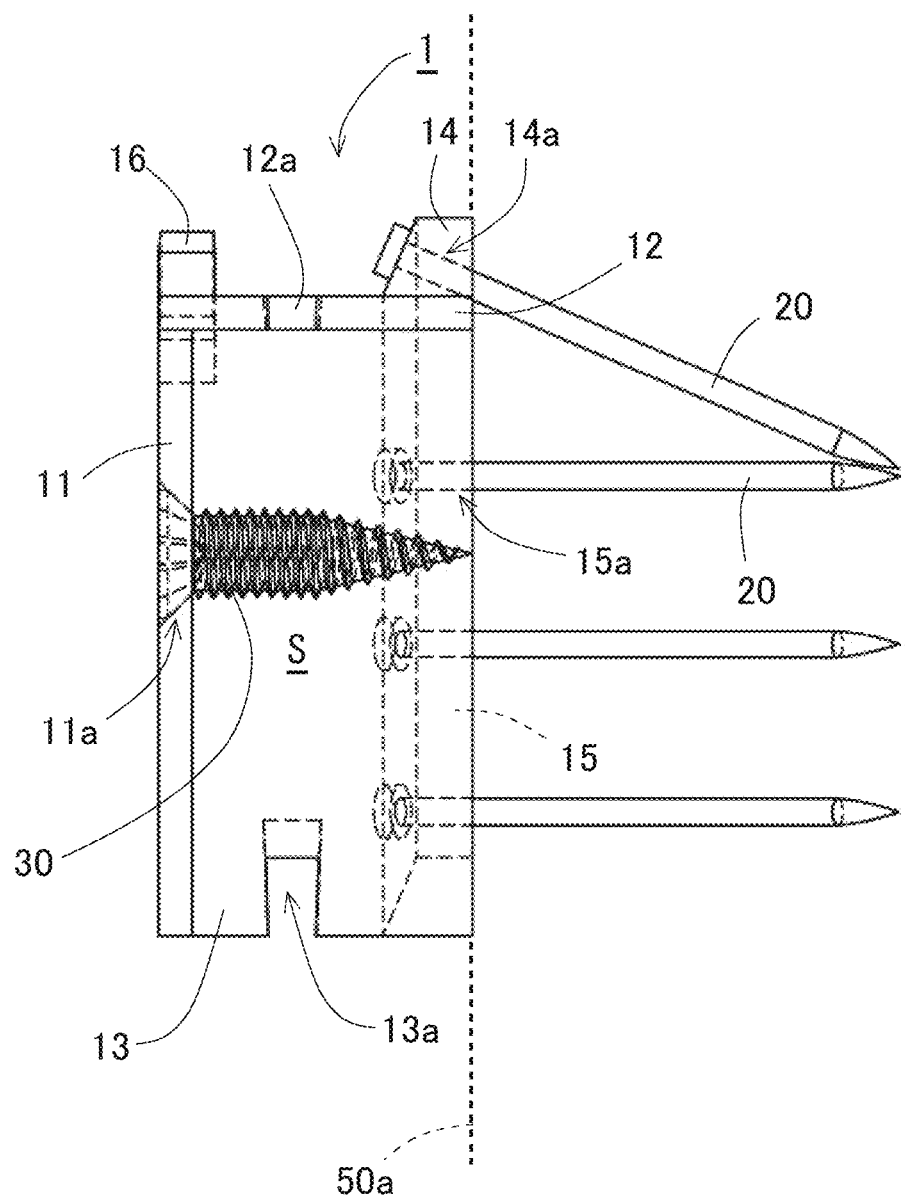
FIG. 8 is a right side view showing the state in which the fixing device for an article attaching member shown in FIGS. 1 to 6 is used, in which nails are respectively inserted through the guide holes of the first engaging portion and the second engaging portion, and the wood screw is inserted through the through hole of the engagement wall.
Figure 9:
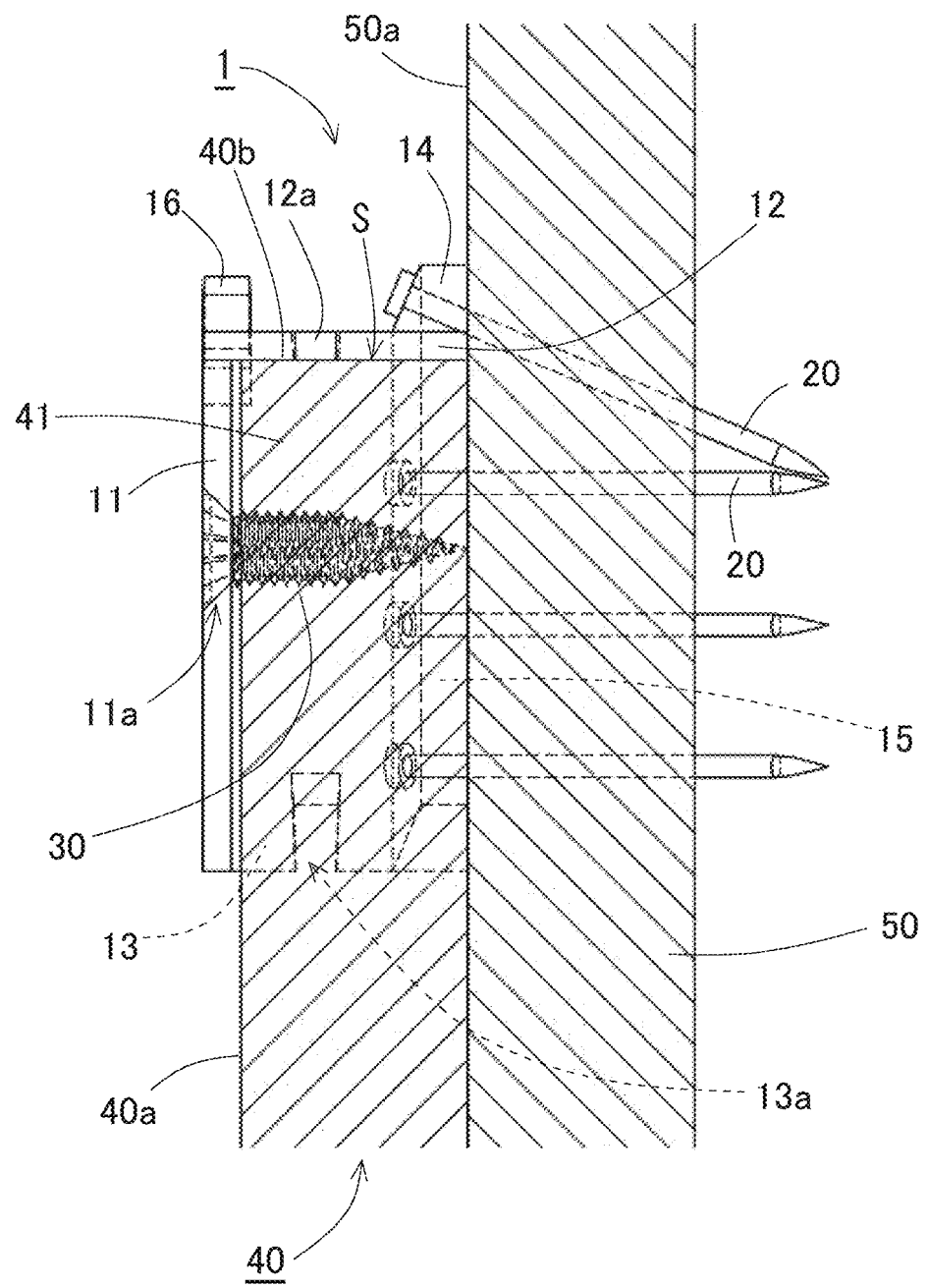
FIG. 9 is a right side view showing the state in which the fixing device for an article attaching member shown in FIGS. 1 to 6 is used; in which one corner portion (engaged portion) of a rectangular plate-shaped article attachment member is engaged with the space, the nails respectively inserted through the guide holes of the first engaging portion and the second engaging portion are pushed into a wall surface made of gypsum board, and the wood screw inserted through the through hole of the engagement wall is screwed into the article attachment member.

At an end of the first side wall 12 on the opposite side to the engagement wall 11 (on the back side of the fixing device 1), a first engaging portion 14 is formed to have such a shape as to slightly protrude outward from the first side wall 12 at a right angle. Here, the first engaging portion 14 has a band-like shape extending with a constant width along the outer surface of the first side wall 12 and is formed integrally with the first side wall 12. In the first engaging portion 14, three linear guide holes 14a for inserting nails 20 are formed at intervals along the outer surface of the first side wall 12. The openings of these three guide holes 14a positioned on the same side as the engagement wall 11 (the surface side of the fixing device 1) are located on the outside of the first side wall 12; however, the openings of these three guide holes 14a positioned on the opposite side to the engagement wall 11 are located near the end of the first side wall 12 positioned on the opposite side to the engagement wall 11. In other words, these three guide holes 14a are slightly inclined from the openings positioned on the same side as the engagement wall 11 toward the openings positioned on the opposite side to the engagement wall 11. As a result, nails 20 inserted through these three guide holes 14a from the surface side of the fixing device 1 are pushed inward obliquely with respect to the first side wall 12 and then, the tips of the nails 20 enter the inside of the first side wall 12 and overlap with the space S, as shown in FIGS. 7 to 9.

It should be noted that since the nails 20 are designed to be pushed obliquely inward with respect to the first side wall 12, the heads of the nails 20 inserted through the corresponding guide holes 14a are always placed at the locations slightly apart from the first side wall 12 toward the outside, so that the first side wall 12 does not become a hindrance. Therefore, there is an advantage that the work of inserting the nails 20 and the work of pushing (driving) the same are easy.

The end of the first engaging portion 14 positioned on the opposite side to the engagement wall 11 is located in the same plane as the end of the first side wall 12 positioned on the opposite side to the engagement wall 11. In other words, the end of the first engaging portion 14 positioned on the opposite side to the engagement wall 11 is flush with the end of the first side wall 12 positioned on the opposite side to the engagement wall 11. Further, the end of the first engaging portion 14 positioned on the same side as the engagement wall 11 forms a tapered surface, and this tapered surface forms an obtuse angle with respect to the outer surface of the first side wall 12. This is to ensure that almost the entire head of the nail 20 inserted through the corresponding guide hole 14a is stopped in close contact with the aforementioned tapered surface, considering the fact that the nails 20 inserted respectively through the three guide holes 14a are designed to be pushed inward obliquely with respect to the first side wall 12. Therefore, there is an advantage that it is possible to prevent injury caused by getting a finger or the like caught on the head of the nail 20 that has not been pushed inward until it contacts the first engaging portion 14.

At an end of the second side wall 13 on the opposite side to the engagement wall 11 (on the back side of the fixing device 1), a second engaging portion 15 is formed to have such a shape as to slightly protrude outward from the second side wall 13 at a right angle, which is similar to the case of the first side wall 12. Here, the second engaging portion 15 has a band-like shape extending with a constant width along the outer surface of the second side wall 13 and is formed integrally with the second side wall 13. In the second engaging portion 15, three linear guide holes 15a for inserting nails 20 are formed at intervals along the outer surface of the second side wall 13. The openings of these three guide holes 15a positioned on the same side as the engagement wall 11 (the surface side of the fixing device 1) are located on the outside of the second side wall 13; however, the openings of these three guide holes 15a positioned on the opposite side to the engagement wall 11 are located near the end of the second side wall 13 positioned on the opposite side to the engagement wall 11. In other words, these three guide holes 15a are slightly inclined from the openings positioned on the same side as the engagement wall 11 toward the openings positioned on the opposite side to the engagement wall 11. As a result, nails 20 inserted through these three guide holes 15a from the surface side of the fixing device 1 are pushed inward obliquely with respect to the second side wall 13 and then, the tips of the nails 20 enter the inside of the second side wall 13 and overlap with the space S, as shown in FIGS. 7 to 9.

It should be noted that, similar to the case of the first side wall 12, since the nails 20 are designed to be pushed obliquely inward with respect to the second side wall 13, the heads of the nails 20 inserted through the corresponding guide holes 15a are always placed at the locations slightly apart from the second side wall 13 toward the outside, so that the second side wall 13 does not become a hindrance. Therefore, there is an advantage that the work of inserting the nails 20 and the work of pushing (driving) the same are easy.

The end of the second engaging portion 15 positioned on the opposite side to the engagement wall 11 is located in the same plane as the end of the second side wall 13 positioned on the opposite side to the engagement wall 11. In other words, the end of the second engaging portion 15 positioned on the opposite side to the engagement wall 11 is flush with the end of the second side wall 13 positioned on the opposite side to the engagement wall 11. Further, the end of the second engaging portion 15 positioned on the same side as the engagement wall 11 forms a tapered surface, and this tapered surface forms an obtuse angle with respect to the outer surface of the second side wall 13. This is to ensure that almost the entire head of the nail 20 inserted through the corresponding guide hole 15a is stopped in close contact with the aforementioned tapered surface, considering the fact that the nails 20 inserted respectively through the three guide holes 15a are designed to be pushed inward obliquely with respect to the second side wall 13. Therefore, there is an advantage that it is possible to prevent injury caused by getting a finger or the like caught on the head of the nail 20 that has not been pushed inward until it contacts the second engaging portion 15.

As described above, the first and second side walls 12 and 13 extend respectively along the two sides 11-1 (the first connecting portion) and 11-2 (the second connecting portion) that sandwich the right angle 11-4 of the engagement wall 11 and are orthogonal to each other. The first and second engaging portions 14 and 15 also extend respectively along the two sides 11-1 (the first connecting portion) and 11-2 (the second connecting portion) that sandwich the right angle 11-4 of the engagement wall 11 and are orthogonal to each other also. Therefore, the three nails 20 in total, which are respectively inserted through the three guide holes 14a, are pushed inward obliquely with respect to the first side wall 12, and the tips of these nails 20 enter the inside of the first side wall 12, and the three nails 20 in total, which are respectively inserted through the three guide holes 15a, are pushed inward obliquely with respect to the second side wall 13, and the tips of these nails 20 enter the inside of the second side wall 13. As a result, the tips of the six nails 20 in total are arranged at positions that overlap with the space S.

A cutout portion 12a is formed in the first side wall 12, and a cutout portion 13a is formed in the second side wall 13. These cutout portions 12a and 13a are provided so that the corner portion of the article attaching member 40 that has been engaged with and held in the space S can be visually recognized from the outside of the fixing device 1. Therefore, if such visual recognition is unnecessary, the cutout portions 12a and 13a may be omitted.

A protrusion 16 having a rectangular cross section is formed at the corner of the engagement wall 11 that corresponds to the right angle 11-4. The protrusion 16 protrudes outward in a plane parallel to the engagement wall 11 in a direction perpendicular to the oblique side 11-3. The protrusion 16 is provided in order to engage a decorative cap member (not shown) that covers the surface of the fixing device 1 after the article attaching member 40 is fixed to the wall surface 50a made of the gypsum board 50 using the fixing device 1. This decorative cap member is exposed to the same side as the surface 40a of the article attaching member 40 when the fixing device 1 is fixed to the wall surface 50a using the nails 20 and thus, there is a risk of giving a bad impression to viewers (users, etc.). Taking this risk into consideration, the decorative cap member is added to improve the appearance of the fixing device 1 after the device 1 is fixed. However, since the decorative cap member has little relation to the present invention, the explanation thereof will be omitted.

(Configuration of Article Attaching Member)

Figure 10:
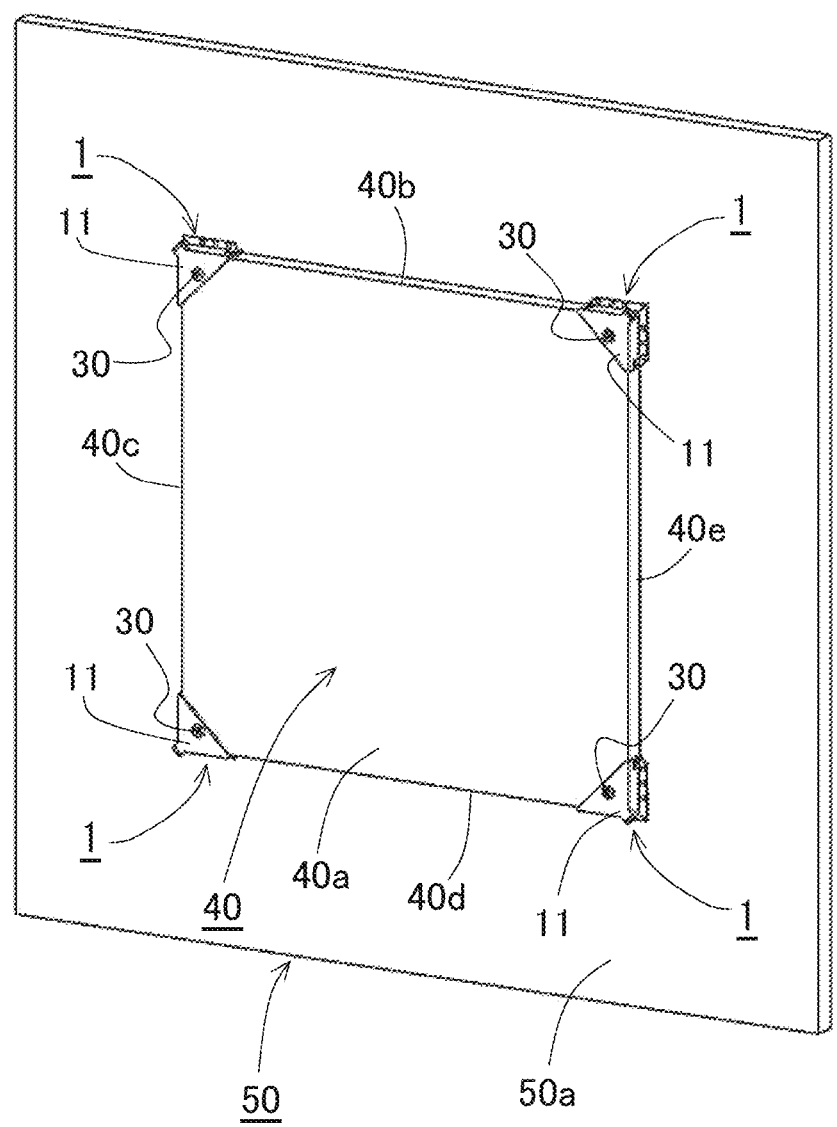
FIG. 10 is a perspective view showing the state in which the fixing device for an article attaching member shown in FIGS. 1 to 6 is used (this is also a fixing structure for an article attaching member according to an embodiment of the present invention), in which the rectangular plate-shaped article attaching member is fixed to the wall surface made of gypsum board by engaging respectively the spaces of the four fixing devices in total with the four corner portions (engaged portions) of the article attaching member.
Figure 23:
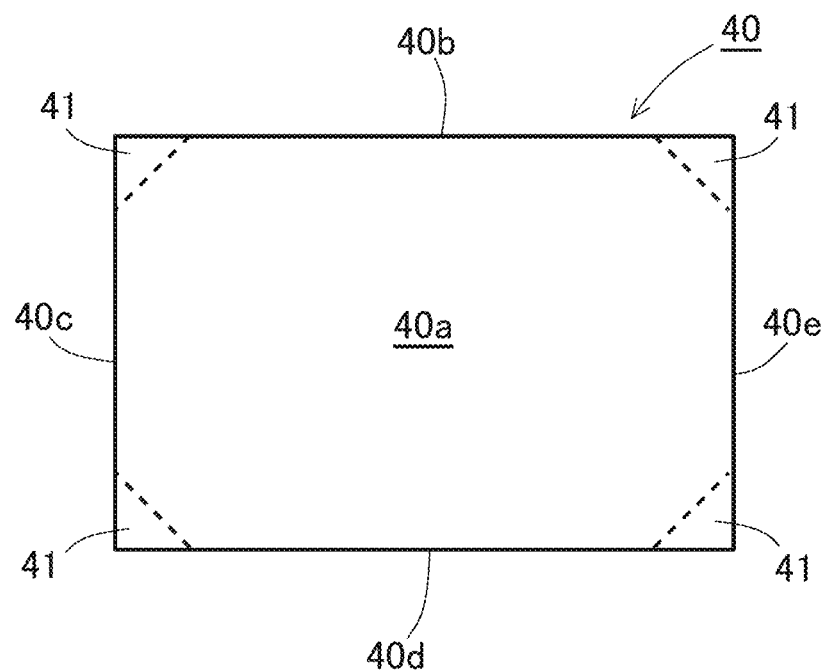
FIG. 23 is a plan view showing the article attaching member to be fixed by the fixing device for an article attaching member shown in FIGS. 1 to 6.

FIG. 23 shows an example of the article attaching member 40 to be fixed to the wall surface 50a by the fixing device 1 having the above-described configuration. As can be seen from this figure, the article attaching member 40 is rectangular plate-shaped in the present embodiment. The rectangular flat surface 40a of the member 40 is a surface to be exposed indoors etc. and to which various articles (articles to be attached) are to be attached. The rectangular flat back surface of the member 40, which is located on the opposite side to the surface 40a, is a surface to be faced on and to be contacted with the wall surface 50a. The member 40 has four side faces around the surface 40a, namely, an upper side face 40b, a left side face 40c, a lower side face 40d, and a right side face 40e. Each of the four corner portions of the member 40 serves as an engaged portion 41 to be engaged with the fixing device 1. As shown in FIG. 10, the member 40 is fixed to the wall surface 50a using the four fixing devices 1 while the entire back surface of the member 40 is faced on and contacted with the wall surface 50a.

Figure 24A:
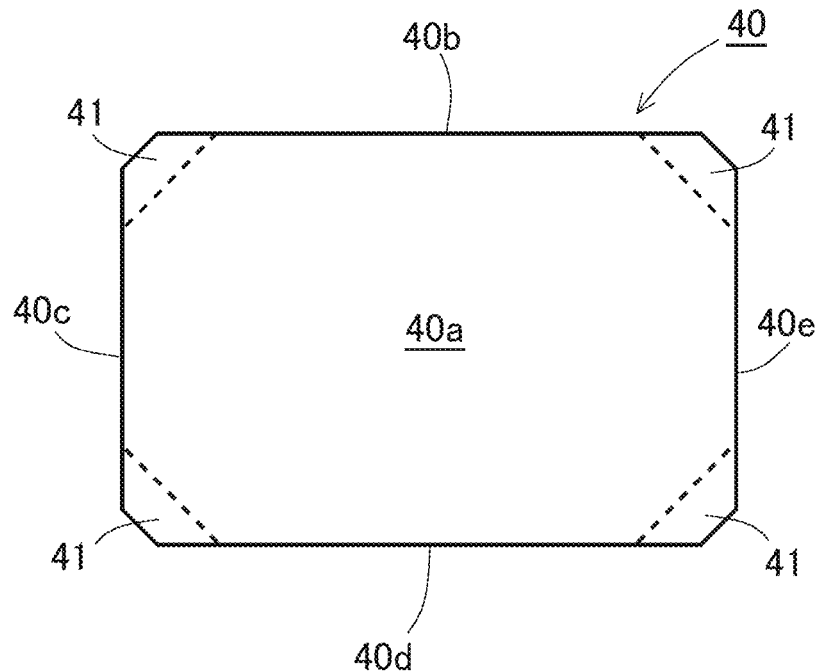
FIG. 24A is a plan view showing another example of the article attaching member to be fixed by the fixing device for an article attaching member shown in FIGS. 1 to 6, in which the rectangular plate-shaped article attaching member has four chamfered corners.
Figure 24B:
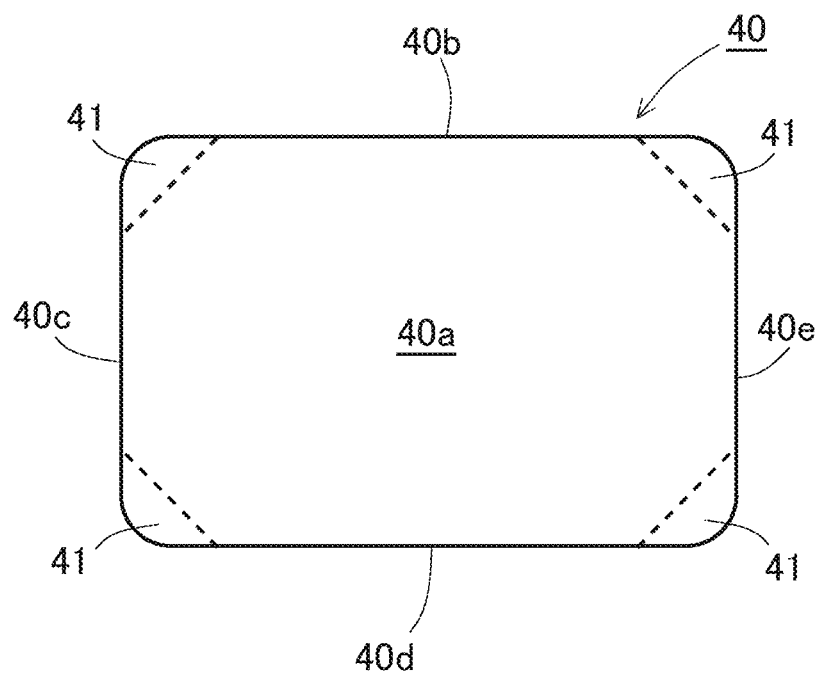
FIG. 24B is a plan view showing still another example of the article attaching member to be fixed by the fixing device for an article attaching member shown in FIGS. 1 to 6, in which the rectangular plate-shaped article attaching member has four rounded corners.

Other examples of the article attaching member 40 are shown in FIGS. 24A and 24B.

The example shown in FIG. 24A has a shape in which the four corner portions (the engaged portions 41) of the article attaching member 40 shown in FIG. 23 are chamfered. In this example, the corner of each engaged portion 41 is chamfered and therefore, when the engaged portion 41 is inserted into the space S of the fixing device 1, there is no possibility that each engaged portion 41 is contacted with the portion corresponding to the right angle 11-4 of the engagement wall 11. Even in this case, since the engaged portion 41 inserted into the space S is configured to be engaged with and held by the engagement wall 11, the first side wall 12, and the second side wall 13 of the fixing device 1 from three directions, the engaged portion 41 can be fixed to the wall surface 50a made of the gypsum board 50 using the fixing device 1 in the same manner as the article attaching member 40 shown in FIG. 23.

The example in FIG. 24B has a shape in which the four corner portions (the engaged portions 41) of the article attaching member 40 shown in FIG. 23 are rounded off (removed). In this example as well, similar to the example shown in FIG. 24A, the article attaching member 40 can be fixed to the wall surface 50a made of the gypsum board 50 using the fixing device 1.

(Usage Form of Fixing Device for Article Attaching Member)

Next, a usage form of the fixing device 1 for an article attaching member according to the embodiment of the present invention having the above-described configuration will be described.

As a premise for explaining the usage form of the fixing device 1 according to the present embodiment, it is assumed that the gypsum board 50 is fixed in a vertical direction as an inner wall of a house, an office building, etc., as shown in FIG. 9, and thus, the wall surface 50a made of the gypsum board 50 is formed in a vertical direction. Moreover, a case in which the rectangular plate-shaped article attaching member 40 (see FIGS. 10 and 23) is fixed to a desired location on the vertical wall surface 50a using the four fixing devices 1 in total will be considered.

As described above, the shape and size of the space S of the fixing device 1 according to the present embodiment are adjusted such that one of the corner portions (which has a triangular prism shape with a right-angled isosceles triangular cross section) of the article attaching member 40 having the aforementioned shape, which serves as the engaged portion 41 of the member 40, can be inserted by way of the opening formed on the side edge of the engagement wall 11 corresponding to the oblique side 11-3 thereof and the opening formed on the opposite side to the engagement wall 11 (the back surface side of the fixing device 1), and such that the inserted engaged portion 41 (the said corner portion) is engaged with and held by the engagement wall 11, the first side wall 12, and the second side wall 13.

First, the rectangular plate-shaped article attaching member 40 is temporarily pressed against a desired installation location on the vertical wall surface 50a made of the gypsum board 50 and then, L-shaped marks are formed at the positions (4 locations) where the corner portions of the member 40 as the engaged portions 41 thereof are placed with a pencil, etc. In this way, the four engaged portions 41 of the member 40 are positioned on the wall surface 50a.

Next, after separating the article attaching member 40 from the wall surface 50a, the spaces S of the first to fourth fixing devices 1 are respectively inserted into and engaged with the four engaged portions 41 of the member 40. At this time, while the two side faces (for example, the upper side face 40b and the left side face 40c) that sandwich each engaged portion 41 of the member 40 are moved to contact with the orthogonally arranged inner surfaces of the first and second side walls 12 and 13 of the corresponding fixing device 1, respectively, the said engaged portion 41 is pushed into the space S of the corresponding fixing device 1 through the opening surface formed on the opposite side to the engagement wall 11 of the said fixing device 1 and the opening formed on the side edge corresponding to the oblique side 11-3 of the said engagement wall 11.

Then, while maintaining the aforementioned engaged state, a wood screw 30 is screwed into a through hole 11a, which is formed in the engagement wall 11 of each fixing device 1, from the outside of the said engagement wall 11, thereby fixing the first to fourth fixing devices 1 to the corresponding engaged portions 41 of the article attaching member 40, respectively. At this time, since the tip of each wood screw 30 enters the inside of the corresponding attaching member 40, the four fixing devices 1 are respectively fixed to the four corresponding engaged portions 41 of the member 40. In this state, each engaged portion 41 is engaged not only with the engagement wall 11 of the corresponding fixing device 1 but also with the first and second side walls 12 and 13 thereof, the strength and stability for fixing each engaged portion 41 to the wall surface 50a are increased compared with the case where each engaged portion 41 is engaged with only the engagement wall 11, which is preferable.

Subsequently, while referring to the four L-shaped marks formed on the wall surface 50a earlier, the position and attitude of the article attaching member 40 to which the four fixing devices 1 have been respectively fixed to the four corresponding engaged portions 41 are adjusted. In this way, the article attaching member 40 is pressed against the desired installation location on the wall surface 50a.

Thereafter, for example, regarding the first fixing device 1 disposed at the upper left (the corner portion sandwiched between the upper side face 40b and the left side face 40c) of the article attaching member 40, a first nail 20 is inserted into any one of the three guide holes 14a of the first engaging portion 14 and the three guide holes 15a of the second engaging portion 15 of the said fixing device 1 until the tip of the said nail 20 reaches the wall surface 50a. Then, the head of the said nail 20 is hit with an appropriate tool (for example, a small hammer, a special jig, etc.), thereby temporarily pushing (driving) the said nail 20 into the wall surface 50a.

Thereafter, in the same manner as described above, second to sixth nails 20 are respectively inserted into the remaining five guide holes 14a and 15a of the first and second engaging portions 14 and 15 of the first fixing device 1 until the tips of the second to sixth nails 20 reach the wall surface 50a. Then, the heads of the said nails 20 are hit with the aforementioned tool, thereby temporarily pushing (driving) the second to sixth nails 20 into the wall surface 50a.

Finally, the first to sixth nails 20 for the first fixing device 1 are further hit with the aforementioned tool, thereby pushing (driving) these nails 20 until their heads come into close contact with the corresponding tapered surfaces of the first engaging portion 14 or the second engaging portion 15. As a result, the first engaging portion 14 and the second engaging portion 15 of the first fixing device 1 are engaged with the wall surface 50a by the first to sixth nails 20 thus pushed (driven) and therefore, the first fixing device 1 itself is also fixed to the wall surface 50a. In this way, the fixation of the first fixing device 1 to the wall surface 50a is completed.

By going through the above steps, the tips of the first to sixth nails 20 for the first fixing device 1 penetrate through the wall surface 50a and deeply enter the inside of the gypsum board 50. At this time, the first to third nails 20 are guided by the corresponding guide holes 14a of the first engaging portion 14 to enter the inside of the gypsum board 50 obliquely inward with respect to the first side wall 12. Moreover, the fourth to sixth nails 20 are guided by the corresponding guide holes 15a of the second engaging portion 15, which is disposed orthogonally to the first engaging portion 14, to enter the inside of the gypsum board 50 obliquely inward with respect to the second side wall 12. Furthermore, on the wall surface 50a, the arrangement direction of the fourth to sixth nails 20 is perpendicular to the arrangement direction of the first to third nails 20. Therefore, the said engaged portion 41 (the corner portion) of the article attaching member 40 can be held on the wall surface 50a with sufficiently high strength by the first fixing device 1. In addition, the said strength can be set sufficient to hold not only the weight of the article attaching member 40 but also the weight of various articles (for example, a metal bracket 60 and a rod-shaped hanger 70) that will be later attached to the surface 40a of the member 40.

For example, the strength exceeding the withstand load (the limit of allowable weight) of the article attaching member 40 can be achieved easily by adjusting the total number of the nails 20 used for the first fixing device 1, or the strength of each nail 20 (for example, diameter, overall length, material, etc.), or both of them, or by adjusting the rigidity, impact resistance, durability, etc. of the said fixing device 1 itself according to the withstand load (the limit of allowable weight) which is set for the said member 40.

Next, the second fixing device 1 is also fixed to the wall surface 50a in the same manner as described above. Specifically, at this stage, one of the engaged portions 41 (the corner portions) of the article attaching member 40 has been fixed to the wall surface 50a by the first fixing device 1 and thus, the member 40 is in the state where it is held on the wall surface 50a only by the first fixing device 1. Therefore, the second fixing device 1 may be fixed in sequence using first to sixth nails 20 in the same manner as described above.

For example, regarding the second fixing device 1 disposed at the upper right (the corner portion sandwiched between the upper side face 40b and the right side face 40e) of the article attaching member 40, a first nail 20 is inserted into any one of the three guide holes 14a of the first engaging portion 14 and the three guide holes 15a of the second engaging portion 15 of the said fixing device 1 until the tip of the said nail 20 reaches the wall surface 50a. Then, the head of the said nail 20 is hit with the aforementioned tool, thereby temporarily pushing (driving) the said nail 20 into the wall surface 50a.

Thereafter, in the same manner as described above, second to sixth nails 20 are respectively inserted into the remaining five guide holes 14a and 15a of the first and second engaging portions 14 and 15 of the second fixing device 1 until the tips of the second to sixth nails 20 reach the wall surface 50a. Then, the heads of the said nails 20 are hit with the aforementioned tool, thereby temporarily pushing (driving) the second to sixth nails 20 into the wall surface 50a.

Finally, the first to sixth nails 20 for the second fixing device 1 are further hit with the aforementioned tool, thereby pushing (driving) these nails 20 until their heads come into close contact with the corresponding tapered surfaces of the first engaging portion 14 or the second engaging portion 15. As a result, the first and second engaging portions 14 and 15 of the second fixing device 1 are engaged with the wall surface 50a by the first to sixth nails 20 thus pushed (driven) in and therefore, the second fixing device 1 itself is also fixed to the wall surface 50a. In this way, the fixation of the second fixing device 1 to the wall surface 50a is completed.

Furthermore, for example, regarding the third fixing device 1 disposed at the lower left (the corner portion sandwiched between the left side face 40c and the lower side face 40d) of the article attaching member 40, in the same manner as described above, first to sixth nails 20 for the third fixing device 1 are pushed (driven) in until the heads of the first to sixth nails 20 come into close contact with the corresponding tapered surfaces of the first engaging portion 14 or the second engaging portion 15. As a result, the first and second engaging portions 14 and 15 of the third fixing device 1 are engaged with the wall surface 50a by the first to sixth nails 20 thus pushed (driven) and therefore, the third fixing device 1 itself is also fixed to the wall surface 50a. In this way, the fixation of the third fixing device 1 to the wall surface 50a is completed.

Finally, for example, regarding the fourth fixing device 1 disposed at the lower right (the corner portion sandwiched between the lower side face 40d and the right side face 40e) of the article attaching member 40, in the same manner as described above, first to sixth nails 20 for the fourth fixing device 1 are pushed (driven) in. As a result, the first and second engaging portions 14 and 15 of the fourth fixing device 1 are engaged with the wall surface 50a by the first to sixth nails 20 thus pushed (driven) in and therefore, the fourth fixing device 1 itself is also fixed to the wall surface 50a. In this way, the fixation of the fourth fixing device 1 to the wall surface 50a is completed.

When the work of fixing the first to fourth fixing devices 1 to the wall surface 50a using the twenty four nails 20 in total is completed in the manner described above, the article attaching member 40 is fixed to the wall surface 50a by the four engaged portions 41 which are respectively arranged at the four engaged portions 41 (the corner portions) of the member 40 in such the state as shown in FIG. 10. In this state, the four engaged portions 41 of the member 40 are held on the wall surface 50a with sufficient strength by the first to fourth fixing devices 1. Moreover, the said strength is such that it is sufficient to hold the total weight obtained by adding the weight of various articles (for example, a metal bracket 60 and a rod-shaped hanger 70) that will be later attached to the surface 40a of the member 40 to the weight of the member 40 itself.

It should be noted that the structure shown in FIG. 10 in which the article attaching member 40 is fixed to the wall surface 50a by the four fixing devices 1 shows a fixing structure for an article attaching member according to an embodiment of the present invention.

Figure 11:
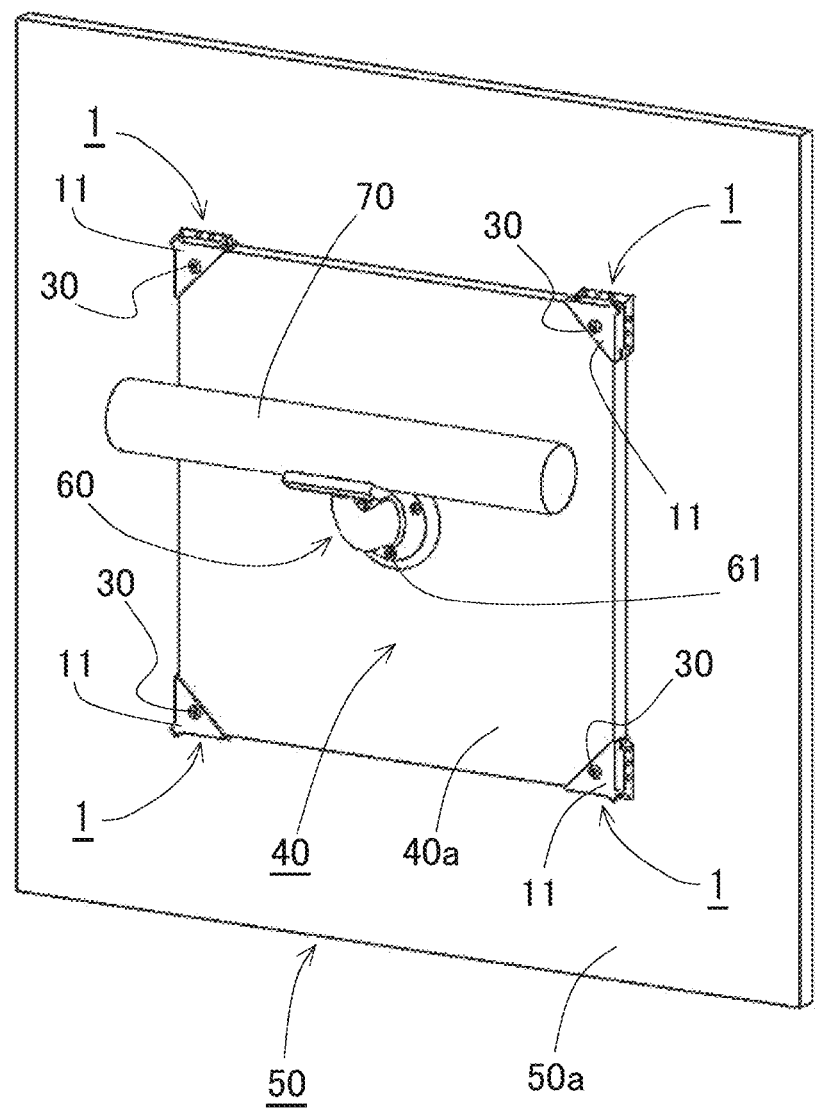
FIG. 11 is a perspective view showing the state in which the fixing device for an article attaching member shown in FIGS. 1 to 6 is used (the fixing structure for an article attaching member according to the embodiment of the present invention), in which a hanger as an article to be attached is screwed into an approximately central part of the rectangular plate-shaped article attaching member that is fixed to the wall surface made of gypsum board in the state shown in FIG. 10.

In the state of FIG. 10, the rectangular plate-shaped article attaching member 40 is fixed to the wall surface 50a by the first to fourth fixing devices 1 which are arranged at the four engaged portions 41 (corner portions) of the member 40. To the surface 40a of the member 40 fixed in the aforementioned manner, for example, a desired article, e.g., a rod-shaped hanger 70, is attached by way of a metal bracket 60, as shown in FIG. 11. In this case, first, the bracket 60 is fixed to the member 40 with screws 61 and then, the hanger 70 is attached to the bracket 60 thus fixed. Alternatively, the hanger 70 may be attached to the bracket 60 first, and then, the bracket 60 which is provided with the hanger 70 may be fixed to the member 40 with the screws 61. It should be noted that the article attaching member 40 may be formed such that a plurality of articles may be attached to the member 40 at the same time, for example, by enlarging the size of the member 40 according to the necessity.

The article or articles to be attached to the article attaching member 40 (attached article or articles) is/are not limited to the rod-shaped hanger 70 shown in FIG. 11. Needless to say, it is possible to attach any article or articles (for example, shelves, hooks, handrails, towel rails, clocks, racks, etc.). Furthermore, regarding the metal bracket 60, it is not limited to that shown in FIG. 11, and it goes without saying that any other mounting member or members can be used for this purpose.

Furthermore, it is difficult to attach articles using screws or nails to the wall surface 50a made of the gypsum board 50. However, in the present embodiment, the article attaching member 40, which is made of wood, is fixed to the wall surface 50a using the four fixing devices 1 and therefore, there is no need to use products which are devised to enable fixation of articles such as hooks and hangers to a wall surface made of gypsum board without using the "gypsum board anchor", such as the article attaching device of Patent Document 1 and the article fixing structure of Patent Document 2 which have been described previously. It is very convenient that many articles that can be attached to a wall surface made of wood or the like using screws or nails can be directly attached to the wall surface 50a made of the gypsum board (specifically, the surface 40a of the article attaching member 40).

(Efficacy Confirmation Test)

The inventors of the present invention actually produced the fixing device 1 for an article attaching member according to the embodiment of the present invention having the aforementioned configuration and then, conducted a test (efficacy confirmation test) to confirm its fixing strength. In this test, the fixing strength of the fixing device 1 was measured at room temperature (approximately 20° C.) using a precision universal testing machine AG-X 50 kN manufactured by Shimadzu Corporation. In addition, a similar test was conducted for a comparative example (described later).

The test procedures were as follows.

(Test of Fixing Device 1 According to Embodiment of the Present Invention)

Figure 12:
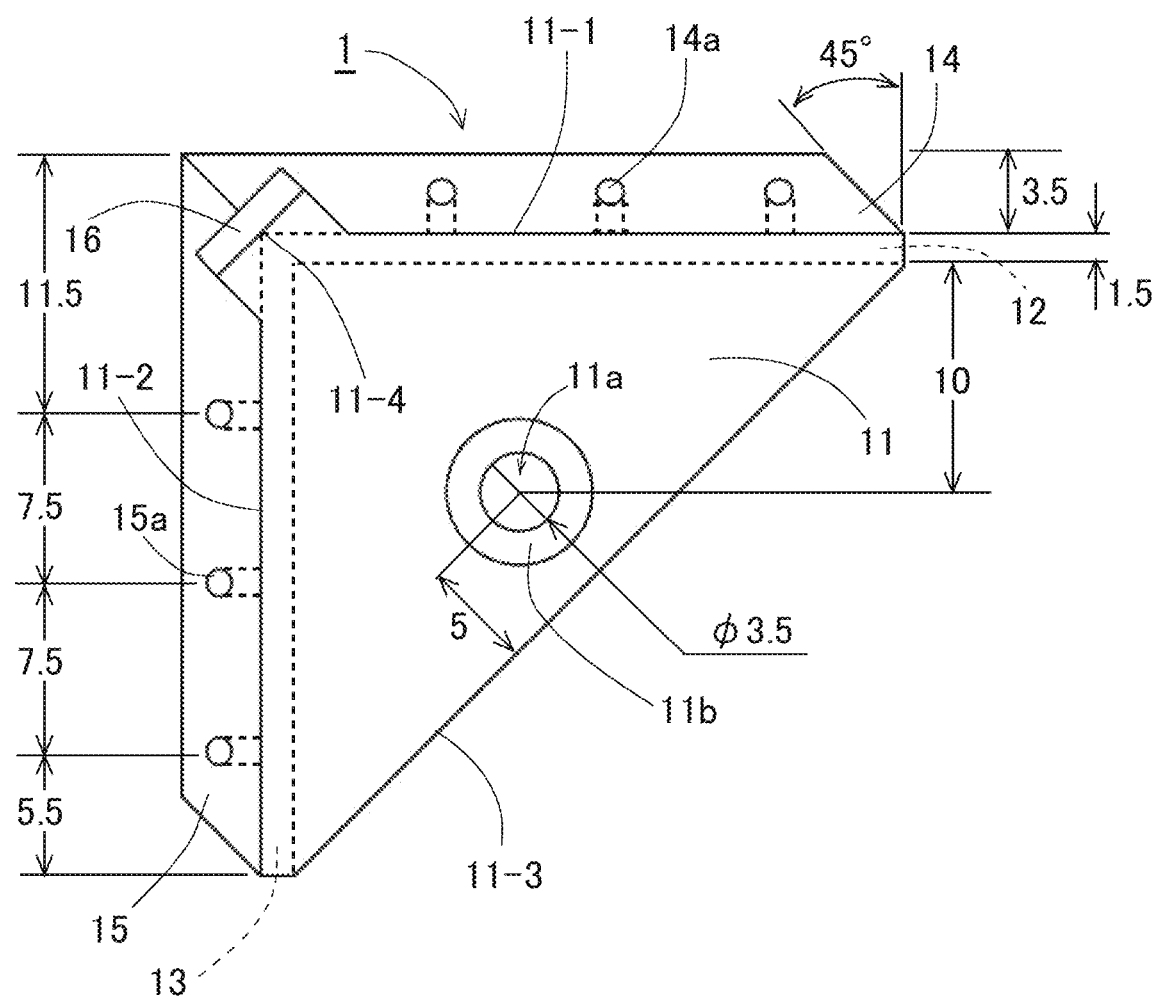
FIG. 12 is a front view showing the dimensions of the fixing device for an article attaching member shown in FIGS. 1 to 6, which was used in an efficacy confirmation test.
Figure 13:
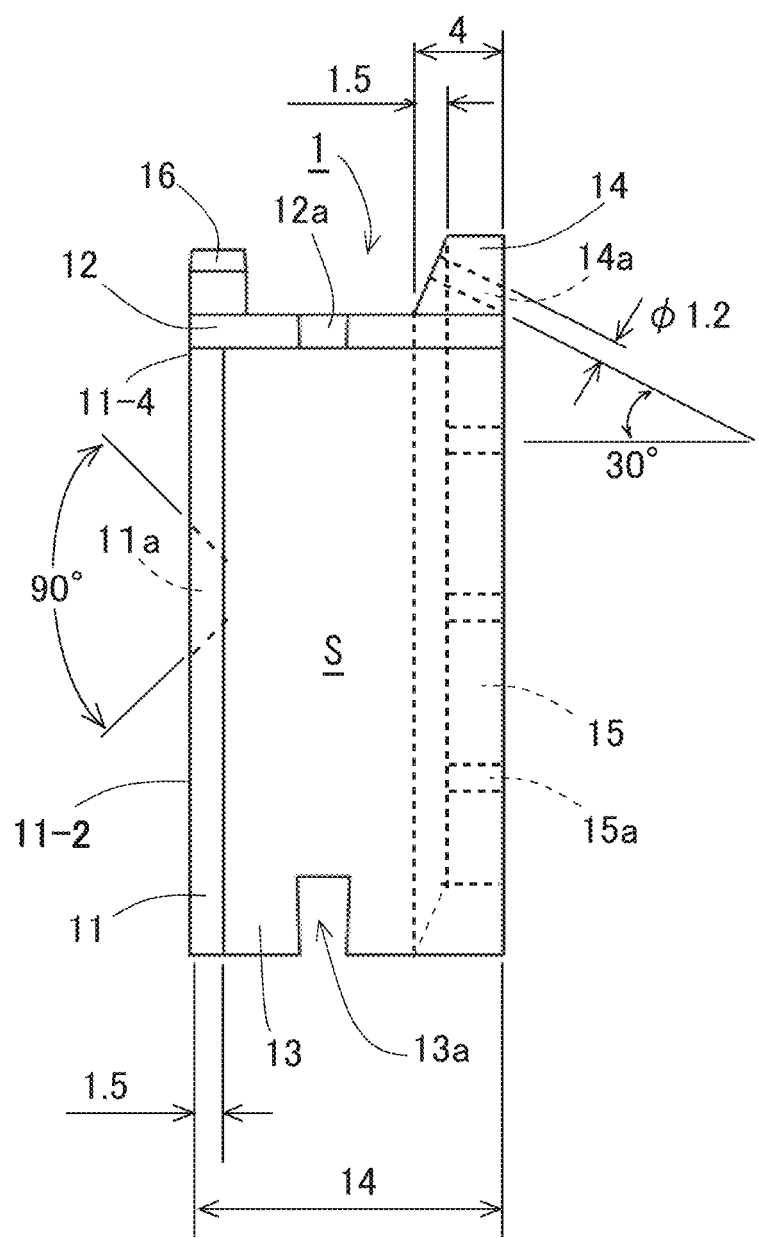
FIG. 13 is a right side view showing the dimensions of the fixing device for an article attaching member shown in FIGS. 1 to 6, which was used in the efficacy confirmation test.

The fixing device 1 according to the embodiment of the present invention had the configuration as shown in FIGS. 1 to 6, had the dimensions as shown in FIGS. 12 and 13, and was made of synthetic resin having physical properties similar to ABS resin. This device 1 was produced using a 3D printer.

As can be seen from FIGS. 12 and 13, the fixing device 1 produced for the said test has a total thickness (total height) of 14 mm. The right-angled isosceles triangular engagement wall 11 of the device 1 has a thickness of 1.5 mm, and the lengths of the two sides 11-1 and 11-2 sandwiching the right angle 11-4 are both 32 mm. The diameter of the through hole 11a of the engagement wall 11 is 3.5 mm. The first side wall 12 and the second side wall 13 both have a thickness of 1.5 mm and a height of 12.5 mm (=14−1.5). Both the first engaging portion 14 and the second side wall 15 have a thickness (height) of 4 mm to 2.5 mm (this is because each of them has the tapered surface) and an amount of the outward protrusion from the first side wall 12 or the second side wall 13 of 3.5 mm. The inclination angles of the guide holes 14a and 15a are both 30 degrees with respect to the direction perpendicular to the engagement wall 11.

Figure 18B:
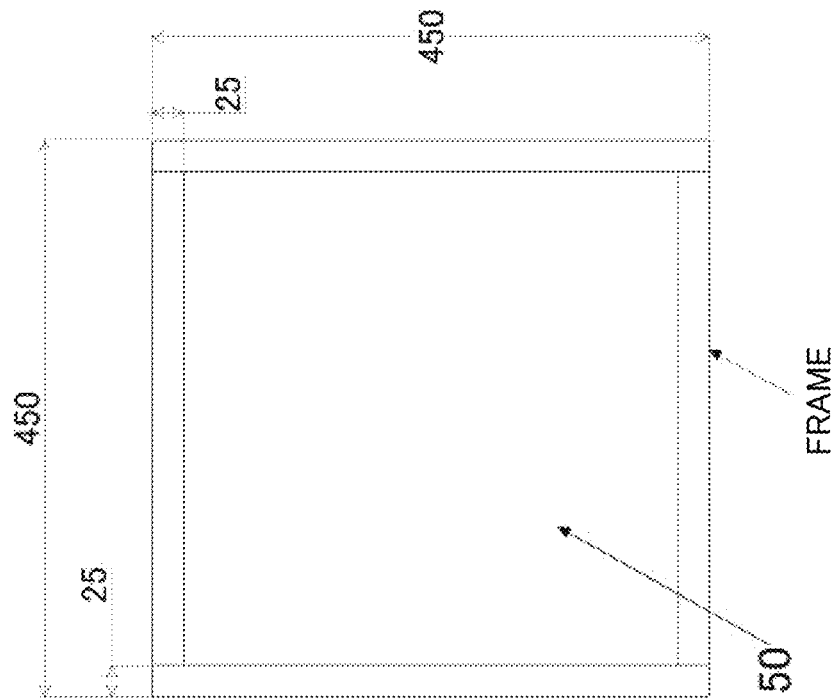
FIG. 18B is a rear view showing the structure and dimensions of the frame used in the efficacy confirmation test of the fixing device for an article attaching member shown in FIGS. 1 to 6.
Figure 18A:
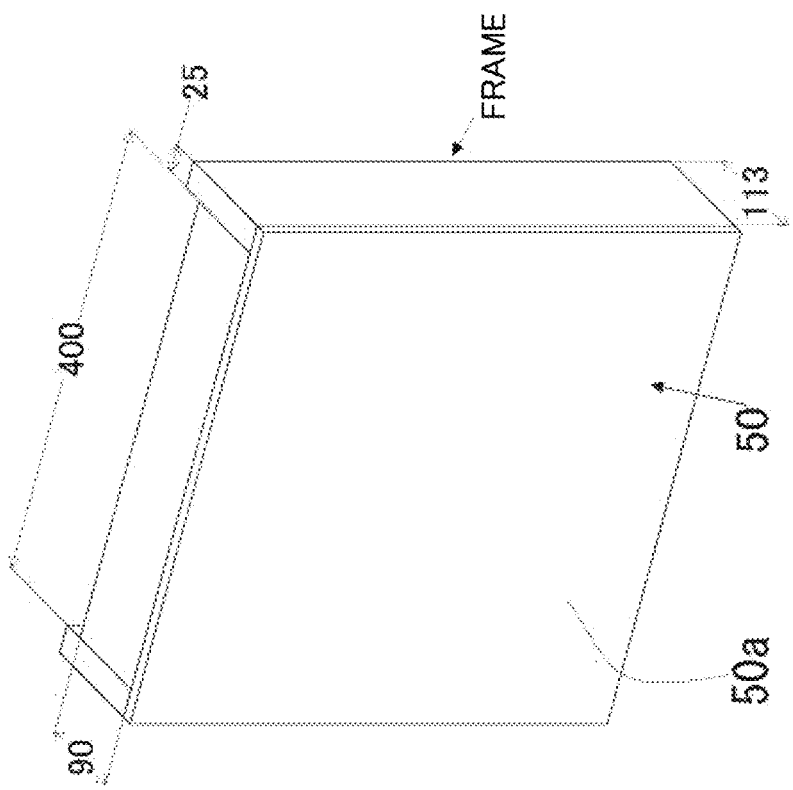
FIG. 18A is a perspective view showing the structure and dimensions of a frame used in the efficacy confirmation test of the fixing device for an article attaching member shown in FIGS. 1 to 6.
Figure 19B:
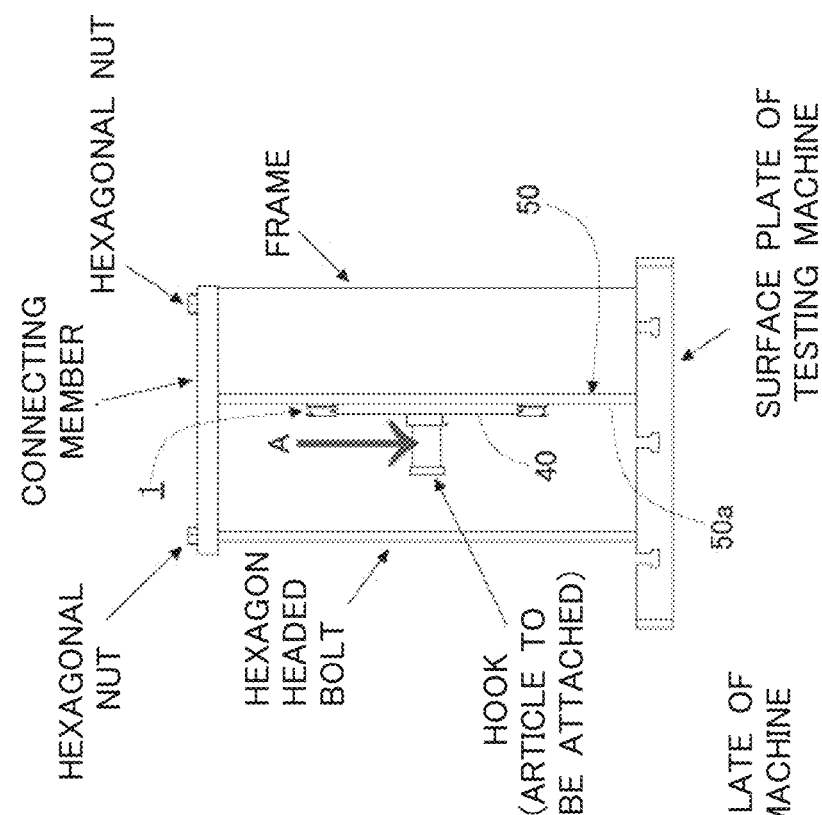
FIG. 19B is a right side view showing the test method of the efficacy confirmation test of the fixing device for an article attaching member shown in FIGS. 1 to 6.
Figure 19A:
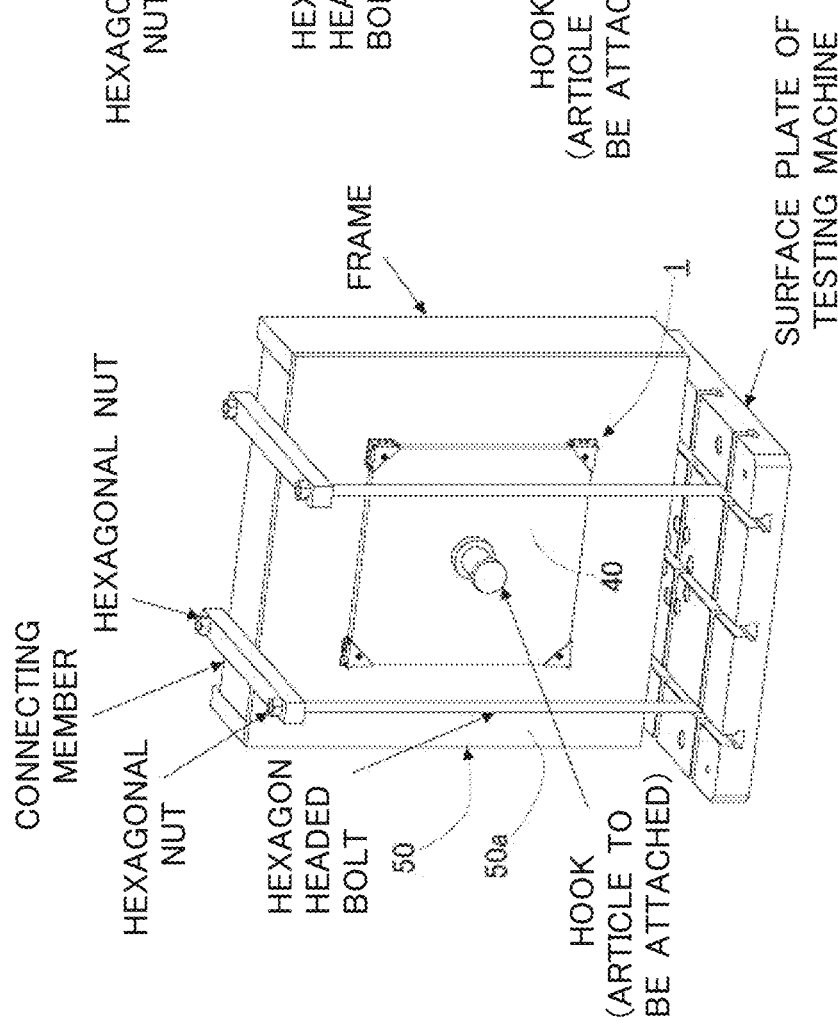
FIG. 19A is a perspective view showing the test method of the efficacy confirmation test of the fixing device for an article attaching member shown in FIGS. 1 to 6.

As the frame for a building, a rectangular frame material made of laminated pine wood, one opening surface of which was closed by a standard gypsum board 50 fixed thereto, was prepared. The other opening surface of the frame material (the frame) was left open. The specific structure and dimensions of the frame were set as shown in FIGS. 18A and 18B. That is, as shown in FIGS. 18A and 18B, the gypsum board 50 (which was manufactured by Yoshino Gypsum) has a square shape of 450 mm in length and width, and has a thickness of 12.5 mm. The left and right vertical plates constituting the frame are each rectangular with a length of 450 mm and a width of 113 mm, and a thickness of 25 mm. The upper and lower horizontal plates constituting the frame are each rectangular with a length of 400 mm and a width of 90 mm, and a thickness of 25 mm. As shown in FIGS. 19A and 19B, at the central part of the wall surface 50a made of the gypsum board 50 fixed to the frame, a JAS-approved structural plywood having a square shape of 250 mm in length and width and 12 mm in thickness was fixed as the article attaching member 40 using the four fixing devices 1 according to the embodiment of the present invention.

Figure 14:
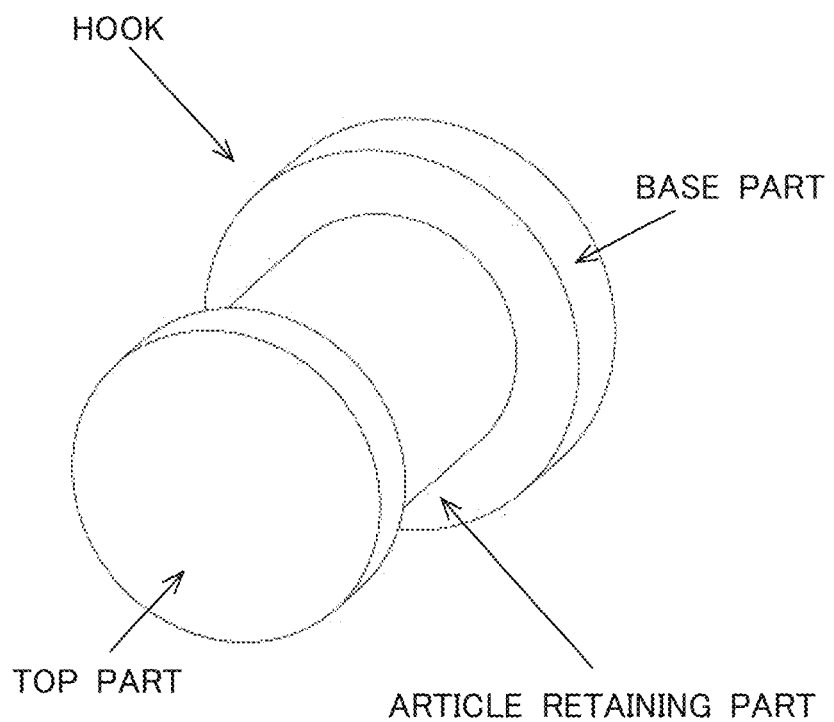
FIG. 14 is a perspective view of a pole-shaped hook (article to be attached) attached to the article attaching member, which was used in the efficacy confirmation test.
Figure 15A:
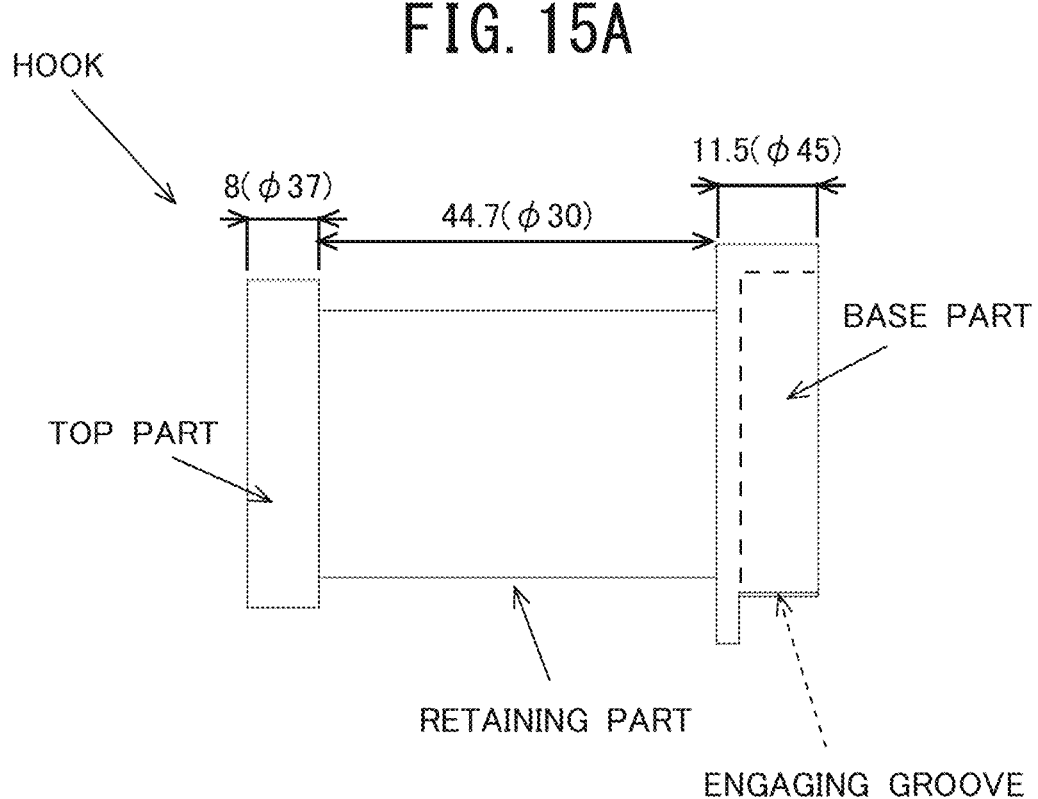
FIG. 15A is a right side view showing the dimensions of the pole-shaped hook (article to be attached) attached to the article attaching member, which was used in the efficacy confirmation test.
Figure 15B:
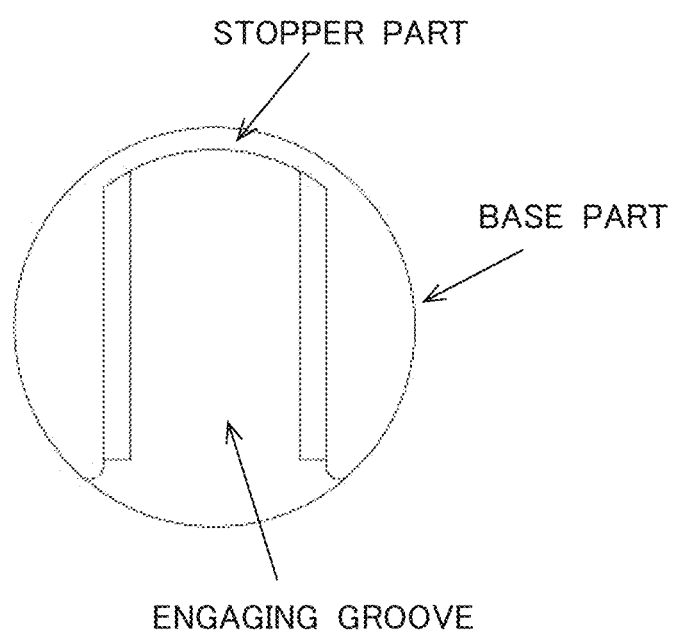
FIG. 15B is a rear view showing the dimensions of the pole-shaped hook (article to be attached) attached to the article attaching member, which was used in the efficacy confirmation test.

As an example of an article to be attached to the article attaching member 40, a commercially available pole-shaped hook (which was made of synthetic resin) was attached to the central part of the JAS-approved structural plywood as the article attaching member 40 in such a way as to be perpendicular to the wall surface 50a. The structure and dimensions of the hook are as shown in FIGS. 14, 15A, and 15B. That is, the hook includes a disc-shaped base part, a disc-shaped top part, and a cylindrical retaining part formed between the base part and the top part. The base part has a diameter of 45 mm and a height of 11.5 mm. The top part has a diameter of 37 mm and a height of 8 mm. The retaining part has a diameter of 30 mm and a height of 44.7 mm.

Figure 16A:
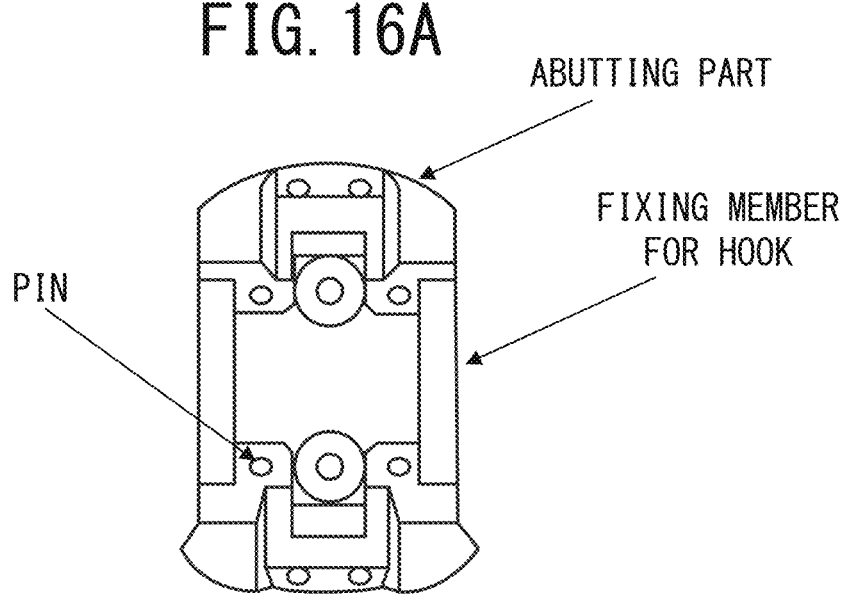
FIG. 16A is a photograph showing the state in which the fixing member for the pole-shaped hook (article to be attached) used in the efficacy confirmation test is fixed, in which the fixing member is fixed to the wall surface using pins (comparative example).
Figure 16B:
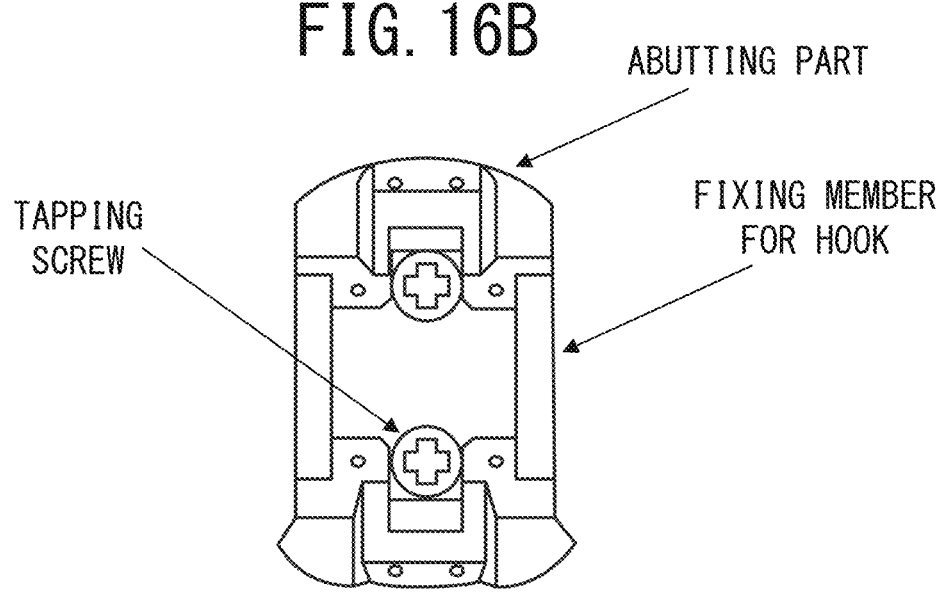
FIG. 16B is a photograph showing the state in which the fixing member for the pole-shaped hook (article to be attached) used in the efficacy confirmation test is fixed, in which the fixing member is fixed to the wall surface using tapping screws (the present invention).
Figure 17A:
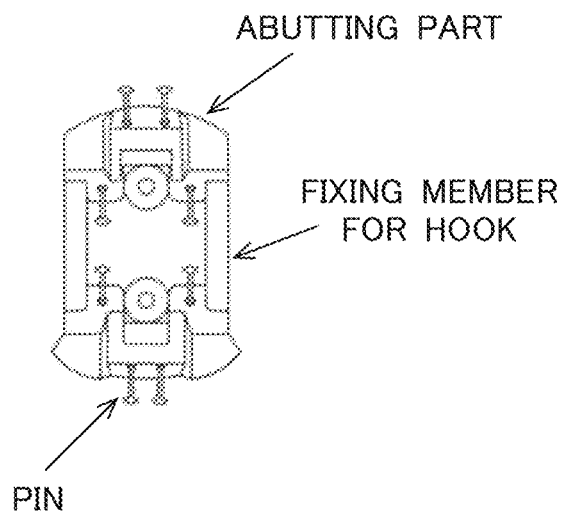
FIG. 17A is a photograph showing the state in which the fixing member for the pole-shaped hook (article to be attached) used in the efficacy confirmation test is fixed, which shows a view when the fixing member is fixed to the wall surface using pins (comparative example).
Figure 17B:
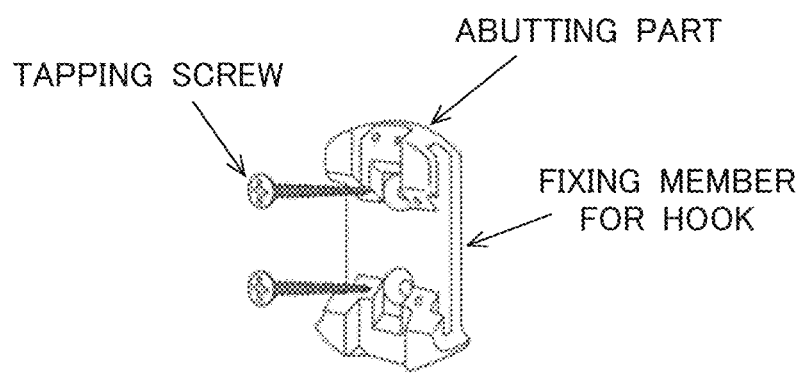
FIG. 17B is a photograph showing the state in which the fixing member for the pole-shaped hook (article to be attached) used in the efficacy confirmation test is fixed, which shows a view when the fixing member is fixed to the wall surface using tapping screws (present invention).

The main body (hook main body) of the pole-shaped hook shown in FIGS. 14, 15A, and 15B was fixed to the central part of the JAS-approved structural plywood as the article attaching member 40 using a dedicated fixing member having a configuration as shown in FIGS. 16B and 17B. At that time, instead of the tapping screws included with the hook, two separately prepared commercially available "flat head tapping screws for wood, 3 mm×12 mm" were used. This is because the total length of the included tapping screws was too long and thus, these tapping screws penetrated the article attaching member 40 (the said structural plywood) and reached the gypsum board 50. In order not to penetrate the gypsum board 50, the above-mentioned flat head tapping screws for wood were used instead.

The main body of the pole-shaped hook of FIGS. 14 and 15 was engaged with the said fixing member in the following wary. Specifically, the aforementioned dedicated fixing member fixed to the article attaching member 40 (the structural plywood) had its left and right outer edges parallel to each other and thus, the entirety of the said fixing member forms an "elongated protrusion" extending in the vertical direction, as shown in FIGS. 16B and 17B. On the other hand, a "vertical groove" (a depression extending in the vertical direction) was formed on the bottom surface of the hook body (the back surface of the disk-shaped base part), as shown in FIGS. 15A and 15B. The "vertical groove" was formed in such a way as to fit into the "elongated protrusion" of the fixing member. Therefore, when the lower end of the "vertical groove" was pushed down from the upper end of the "elongated protrusion" of the fixing member while fitting the said lower end into the "elongated protrusion", the "vertical groove" was moved downward while being fitted into the "elongated protrusion". However, the stopper part formed at the upper end of the "vertical groove" (see FIG. 15B) was brought into contact with the abutting part formed at the upper end of the "elongated protrusion" (see FIG. 16B and FIG. 17B) and thus, the said stopper part was unable to descend any further. In this way, the hook body was reliably held by and fixed to the article attaching member 40 (the structural plywood) by the fixing member at its stop position (see FIGS. 19A and 19B). The engagement of the hook body with the fixing member was conducted in such the manner as described above.

The frame to which the pole-shaped hook was fixed to the central part of the article attaching member 40 (the structural plywood) was fixed on the surface plate of the aforementioned precision universal testing machine, as shown in FIGS. 19A and 19B. Specifically, the frame was fixed on the horizontally arranged surface plate so as to be perpendicular to the wall surface 50a of the gypsum board 50. Two rod-shaped connecting members and four hexagon headed bolts were used for this fixation. The two connecting members were arranged at intervals on the upper end surface of the frame. Furthermore, the two hexagon headed bolts were disposed in front of the frame, the upper ends of the said two bolts were engaged with the front ends of the corresponding connecting members, and hexagonal nuts were respectively screwed into the upper ends of the said two bolts to be fixed to each other. Similarly, the other two hexagon headed bolts were arranged at the rear of the frame, the upper ends of the said two bolts were engaged with the rear ends of the corresponding connecting members, and hexagonal nuts were respectively screwed into the upper ends of the said two bolts to be fixed to each other. The state at this stage is as shown in FIGS. 19A and 19B.

After completing the preparation in the above-described manner, a vertically downward load was continuously applied to the center of the cylindrical retaining part of the aforementioned pole-shaped hook (the part located between the base part and the top part) shown in FIGS. 14, 15A, and 15B using the aforementioned precision universal testing machine (see the arrow A in FIG. 19B). After reaching the maximum load, application of the vertically downward load was continued until the load decreased to 60% of the maximum load or until the displacement reached 10 mm or more.

(Test of Comparative Example)

In order to compare with the result of the test for the fixing device 1 according to the present invention described above, a similar test was conducted on a comparative example. In the test of the comparative example, a frame having the same configuration as that used in the test for the fixing device 1 according to the present invention was used. As the frame used in the test of the comparative example, similar to that used in the test of the fixing device 1 according to the present invention, a rectangular frame material made of laminated pine wood, one opening surface of which was closed by a standard gypsum board 50 fixed thereto, was used. The other opening surface of the said frame material (the frame) was left open. The specific structure and dimensions of the said frame were set as shown in FIGS. 18A and 18B. However, unlike the aforementioned frame used in the test of the fixing device 1 according to the present invention, a JAS-approved structural plywood as the article attaching member 40 was not fixed at the central part of the wall surface 50a made of the gypsum board 50 which was fixed to the said frame. Therefore, in the test of the comparative example, the entire wall surface 50a made of the gypsum board 50 which was fixed to the said frame was exposed (see FIGS. 20A and 20B).

At the central part of the gypsum board 50 fixed to the said frame, a commercially available pole-shaped hook (which was made of synthetic resin), which was the same as that used in the above-described test of the fixing device 1 according to the present invention, was attached in such a way as to be perpendicular to the wall surface 50a. The structure and dimensions of the said hook are as shown in FIGS. 14, 15A, and 15B.

The main body of the pole-shaped hook (hook main body) shown in FIGS. 14, 15A, and 15B was fixed to the central part of the gypsum board 50 using a dedicated fixing member having a configuration shown in FIGS. 16A and 17A. At that time, eight dedicated pins which were included with the hook were used.

When engaging the main body of the pole-shaped hook of FIGS. 14, 15A, and 15B with the fixing member, similar to the case of the fixing device 1 according to the present invention, the lower end of the "vertical groove" formed on the bottom surface of the hook main body was pushed down from the upper end of the "elongated protrusion" of the fixing member while fitting the said lower end into the "elongated protrusion" and then, the said lower end was lowered until the stopper part (see FIG. 15B) formed at the upper end of the "vertical groove" was brought into contact with the abutting part (see FIG. 16B and FIG. 17B) formed at the upper end of the "elongated protrusion". Thus, the hook main body was reliably held by and fixed to the wall surface 50a by the fixing member at its stop position (see FIGS. 20A and 20B).

Figure 20B:
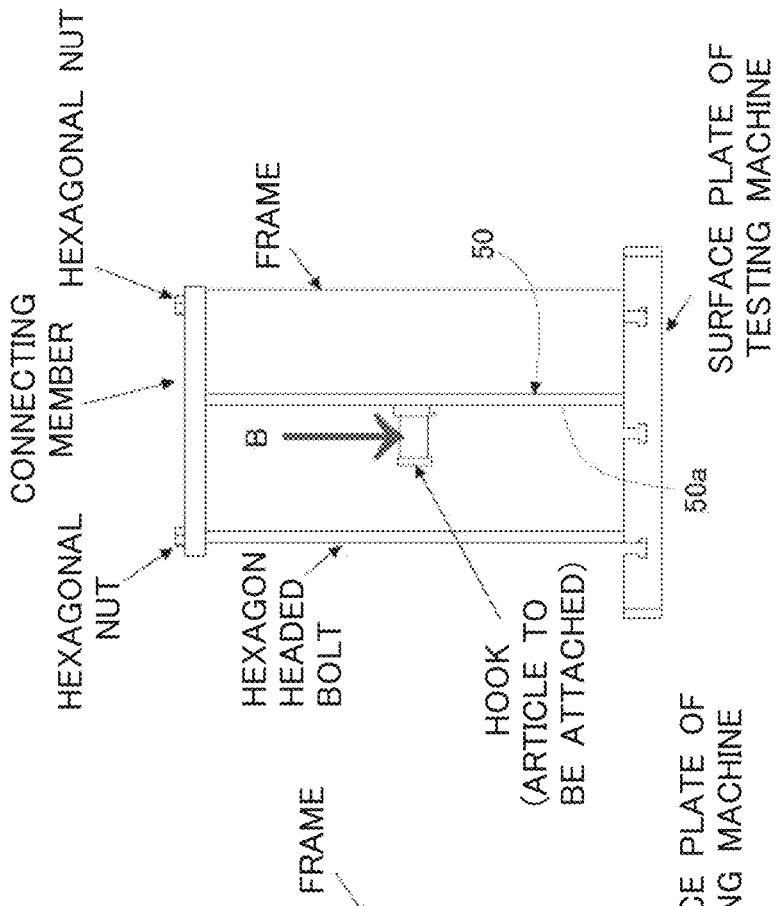
FIG. 20B is a right side view showing the test method for the comparative example.
Figure 20A:
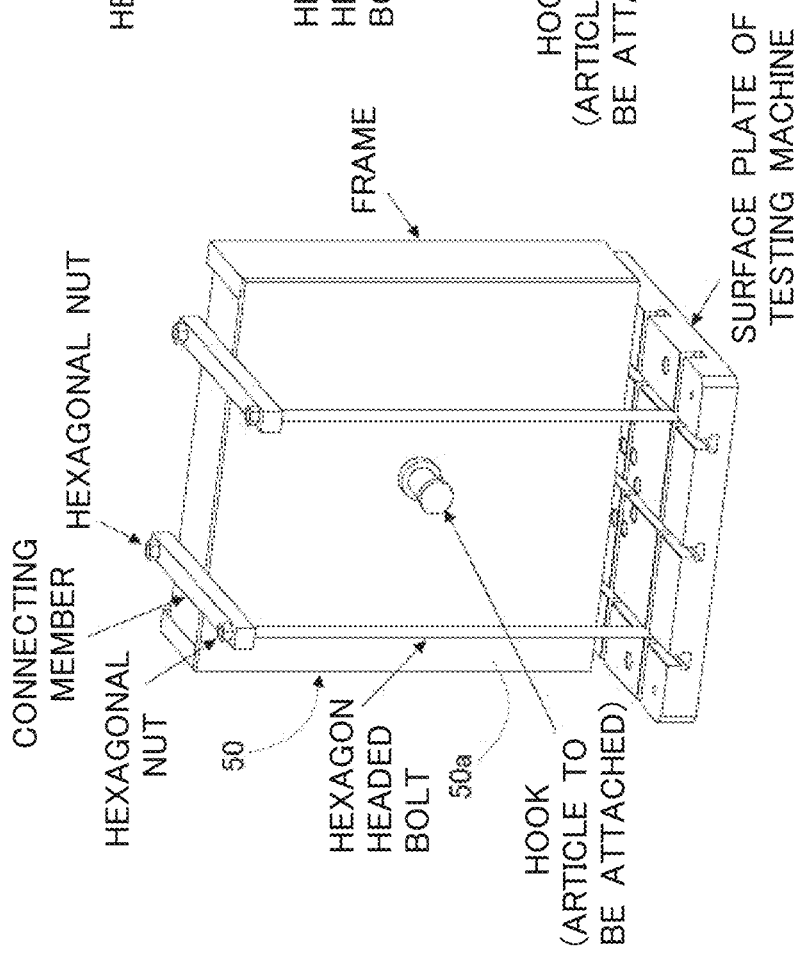
FIG. 20A is a perspective view showing the test method for the comparative example.

The frame to which the pole-shaped hook was fixed in the central part of the wall surface 50a made of the gypsum board 50 was fixed on the surface plate of the aforementioned precision universal testing machine, as shown in FIGS. 20A and 20B. The fixing method of the said frame was the same as that used in the test of the fixing device 1 according to the present invention described above.

After completing the preparation in the above-described manner, a vertically downward load was continuously applied to the center of the cylindrical retaining part of the pole-shaped hook (the part located between the base part and the top part) shown in FIGS. 14, 15A, and 15B using the aforementioned precision universal testing machine (see the arrow B in FIG. 20B). After reaching the maximum load, application of the vertically downward load was continued until the load decreased to 60% of the maximum load or until the displacement reached 10 mm or more. This is the same as the test of the fixing device 1 according to the invention described above.

(Test Results)

Figure 21:
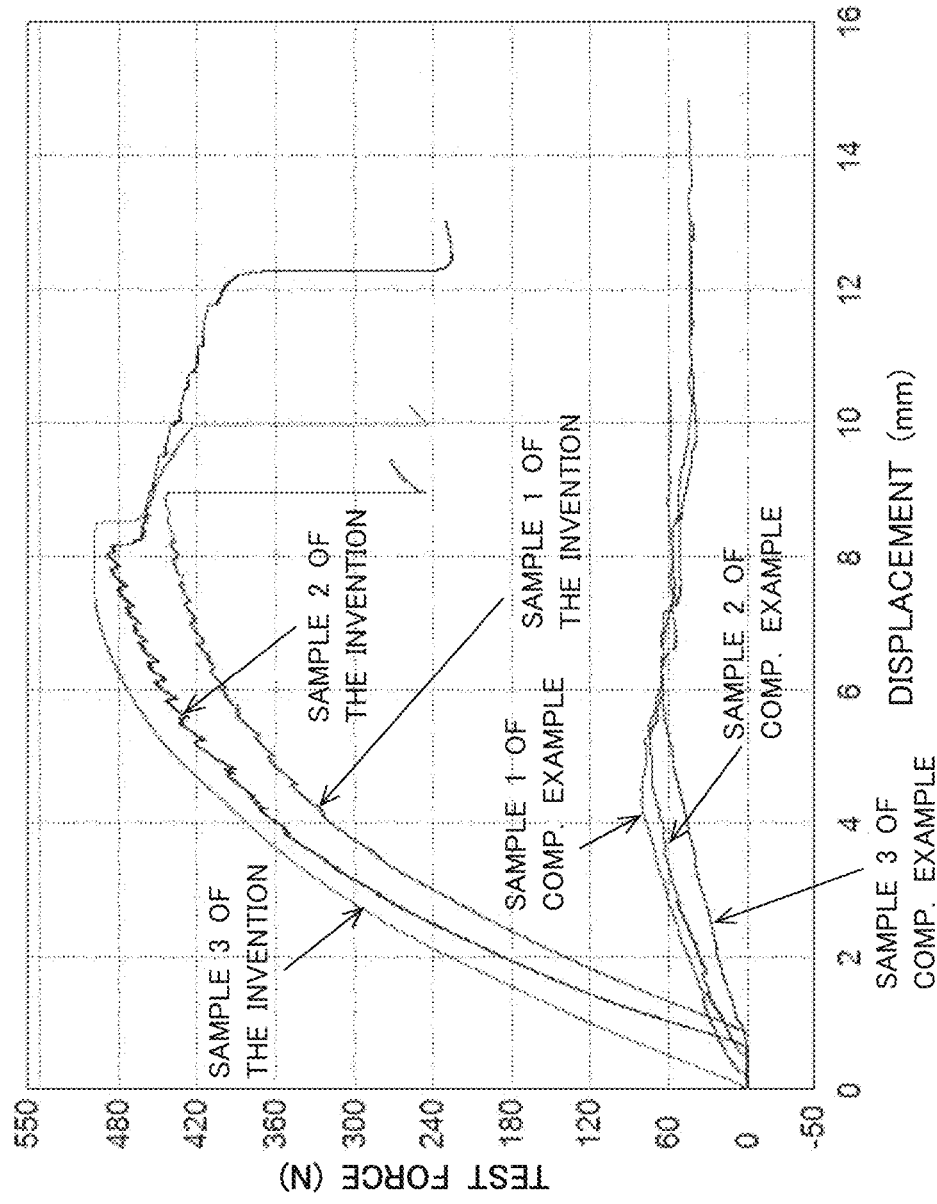
FIG. 21 is a graph showing the test results of the efficacy confirmation tests of the fixing device for an article attaching member shown in FIGS. 1 to 6 and the comparative example.

The test results of the efficacy confirmation tests conducted as described above are shown in FIGS. 21 and 22. As is clear from these test results, the maximum load of 444.26 N was obtained for a sample 1 of the fixing device 1 according to the present invention, the maximum load of 488.45 N was obtained for a sample 2 of the device 1, and the maximum load of 498.88 N was obtained for a sample 3 of the device 1. These values are strong enough to fix an article or articles to the fragile wall surface 50a made of the gypsum board 50 or the like, where it is difficult to attach an article or articles using screws or nails, mechanically using screws or nails, or physically using magnetic force, etc. Further, the maximum displacement was 8.87 mm for the sample 1, 8.05 mm for the sample 2, and 7.65 mm for the sample 3. As described later, no abnormality was observed in the fixing device 1 and the article attaching member 40 (the aforementioned structural plywood) and thus, it is presumed that even with this degree of displacement, no problem would occur in the aforementioned fixing device 1 according to the present invention.

Furthermore, no abnormality was observed in the aforementioned fixing device 1 according to the present invention, and no rattling and no displacement of the article attaching member 40 (the aforementioned structural plywood) occurred. In all of the samples 1 to 3 of the fixing device 1 according to the present invention, the pole-shaped hook was broken before the fixing device 1 was destroyed, but the cause of this was the breakage of the fixing member for the hook. It was assumed that since the fixing member was firmly fixed with the tapping screws, the tapping screws themselves did not fall off; however, the fixing member itself was broken instead, which resulted in the breakage of the pole-shaped hook.

On the other hand, in the test of the comparative example, the maximum load of 80.80 N was obtained for a sample 1 of the comparative example, the maximum load of 65.93 N was obtained for a sample 2 thereof, and the maximum load of 74.85 N was obtained for a sample 3 thereof. Therefore, it can be seen that the maximum load in the comparative example is as low as (1/5) to (1/6) of that in the fixing device 1 according to the present invention. Moreover, since the maximum displacement in the comparative example was 4.32 mm for the sample 1, 6.77 mm for the sample 2, and 5.47 mm for the sample 3, it can be seen that the maximum displacement in the comparative example is as low as (1/2) to (1/3) of that in the fixing device 1 according to the present invention. In the comparative example, since the fixing member was fixed with the eight dedicated pins, none of the samples 1 to 3 could withstand the applied load, and the dedicated pins fell off from the gypsum board 50; as a result, the hook itself also fell off. Therefore, in the comparative example, only (1/5) to (1/6) of the maximum load of the fixing device 1 according to the present invention could be obtained and thus, it can be seen that a heavy article cannot be attached. Unlike this, in the fixing device 1 according to the present invention, since a sufficiently large maximum load (approximately 5 to 6 times that of the comparative example) could be obtained, it can be seen that the fixing device 1 can sufficiently withstand the weight which is calculated by adding the weight of the article or articles attached to the article attaching member 40 (article(s) to be attached) to the weight of the article attaching member 40 (the aforementioned structural plywood), that is, the total weight of the article attaching member 40 and the article or articles to be attached.

In addition, in the above-mentioned efficacy confirmation test, the total strength of the four fixing devices 1 was measured on the supposition of the actual usage situation of the fixing device 1 according to the present invention, and the strength of the single fixing device 1 was not measured. However, it is understood that no problem will occur. This is because, as explained in the aforementioned embodiment, the fixing device 1 according to the present invention was created on the assumption that a plurality of the fixing devices 1 are used in combination according to the shape of the article attaching member 40 and/or the number of the engaged portions 40*a* of the said member 40.

(Effects of Fixing Device for Article Attaching Member)

With the fixing device 1 for an article attaching member according to the embodiment of the present invention, as is clear from the detailed explanation above, since the above-described configuration is provided, when the nails 20 inserted respectively through the three guide holes 14*a* of the first engaging portion 14 are pushed into the wall surface 50*a* to thereby engage the first engaging portion 14 with the wall surface 50*a* in the state where the first engaging portion 14 is contacted with the wall surface 50*a*, and the nails 20 inserted respectively through the three guide holes 15*a* of the second engaging portion 15 are pushed into the wall surface 50*a* to thereby engage the second engaging portion 15 with the wall surface 50*a* in the state where the second engaging portion 15 is contacted with the wall surface 50*a*, the space S formed by the engagement wall 11, the first side wall 12, and the second side wall 13 is located on the wall surface 50*a*. The space S is capable of receiving one of the engaged portions 41 of the article attaching member 40, and the engaged portion 41 of the member 40 received in the space S is adapted to be engaged with the engagement wall 11.

Therefore, for example, if the engagement wall 11 is engaged with the engaged portion 41 of the article attaching member 40 in the space S before engaging the first and second engaging portions 14 and 15 with the wall surface 50*a* in the above-described manner using the nails 20, it is possible to fix the member 40 to the wall surface 50*a* at a desired position by simply engaging the first and second engaging portions 14 and 15 with the wall surface 50*a*.

Alternatively, the engagement wall 11 may be engaged with the engaged portion 41 of the article attaching member 40 in the space S after the first and second engaging portions 14 and 15 are engaged with the wall surface 50*a* in the above-described manner using the nails 20. Even in this case also, it is possible to fix the member 40 to the wall surface 50*a* at the desired position by simply engaging the first and second engaging portions 14 and 15 with the wall surface 50*a*.

Further, the first and second engaging portions 14 and 15 are formed to be respectively connected to the side edge (the first connecting portion) and the side edge (the second connecting portion) of the engagement wall 11 that correspond to the sides 11-1 and 11-2 thereof and that extend in the directions orthogonal to each other, in which the first and second engaging portions 14 and 15 are formed to be perpendicular to the engagement wall 11. Therefore, the nails 20 that have been respectively inserted through the guide holes 14*a* of the first engaging portion 14 and pushed into the wall surface 50*a* and the nails 20 that have been respectively inserted through the guide holes 15*a* of the second engaging portion 15 and pushed into the wall surface 50*a* are located at positions (regions) apart (displaced) from each other, and are extended in different directions from each other in the inside of the wall surface 50*a*. For this reason, the fixing device 1 is mechanically supported on the wall surface 50*a* by the plurality of the nails 20 extending in the different directions at the mutually distant (shifted) positions (regions). Accordingly, the mechanical strength when the fixing device 1 is fixed to the wall surface 50*a* is sufficient.

Moreover, what is required to fix the fixing device 1 to the wall surface 50*a* is the work of engaging the first and second engaging portions 14 and 15 to the wall surface 50*a* in the aforementioned manner using the nails 20 and the work of engaging the engagement wall 11 with the engaged portion 41 of the article attaching member 40 in the space S. Therefore, the work required to fix the fixing device 1 to the wall surface 50*a* is easy.

As a result, with the fixing device 1 according to the present embodiment, the article attaching member 40, to which a desired article or articles is/are attachable, can be fixed to the fragile wall surface 50*a* made of the gypsum board 50 or the like with sufficient mechanical strength by easy work. Regarding this mechanical strength, it has been confirmed by the inventors of the present invention that sufficient mechanical strength to hold the total weight including not only the weight of the article attaching member 40 but also the weight of one or more various articles (articles to be attached) that are assumed to be attached to the member 40 later can be realized (see the aforementioned efficacy confirmation test).

Note that it is preferable to use two or more of the fixing devices 1 according to the present embodiment in combination, depending on the shape and number of the engaged portions 41 of the article attaching member 40. This is because the member 40 is fixed at two or more places using the two or more fixing devices 1 and thus, the member 40 can be fixed to the wall surface 50a with higher mechanical strength than the case where the only one fixing device 1 is used, which means that the fixing strength of the member 40 as a whole can be further increased.

In addition to the above-mentioned advantageous effects, the fixing device 1 according to the present embodiment has the following effects also.

Specifically, by using the fixing device 1 according to the present embodiment, the article attaching member 40, to which a desired article or articles is/are attachable, can be fixed to the fragile wall surface 50a made of the gypsum board 50 or the like with sufficient mechanical strength and therefore, a desired article or articles can be attached arbitrarily using the member 40 thus fixed. As a result, with the fixing device 1 according to the present embodiment, there is another advantageous effect that a desired article or articles can be attached to the wall surface 50a made of the gypsum board 50 or the like even if the products such as the aforementioned article attaching device of Patent Document 1 and the aforementioned article fixing structure of Patent Document 2, which are devised to enable fixation of an article such as a hook and hanger to a wall surface made of gypsum board without using the "gypsum board anchor", are not used.

Furthermore, when the fixing device 1 according to the present embodiment is used, the article attaching member 40, to which a desired article or articles is/are attachable, can be fixed to the fragile wall surface 50a made of the gypsum board 50 or the like with sufficient mechanical strength as described above. Thus, it is possible to attach a desired number of desired articles using the member 40 which has been fixed in this way. That is, the desired article or articles is/are not directly fixed to the wall surface 50a but is/are fixed to the member 40 which has been fixed to the wall surface 50a using the fixing device 1. As a result, by appropriately selecting the shape and/or material of the article attaching member 40, it is possible to attach a desired article or articles to the wall surface 50a mechanically using screws or nails, or physically using magnetic force or the like. For example, if a wooden board is used as the member 40, articles such as hooks and hangers can be attached mechanically using screws or nails. If an iron plate is used as the member 40, articles such as hooks and hangers can be attached physically using magnetic force. Furthermore, the number of articles to be attached can be increased up to an allowable value that depends on the size and/or withstand load (the limit of allowable weight) of the member 40.

Accordingly, with the fixing device 1 according to the present embodiment, there is a further advantageous effect that both the types and number of articles that can be attached to the fragile wall surface 50a made of the gypsum board 50 or the like can be significantly expanded than before.

Furthermore, when the fixing device 1 according to the present embodiment is used, the article attaching member 40, to which a desired article or articles is/are attachable, can be fixed to the fragile wall surface 50a made of the gypsum board 50 or the like with sufficient mechanical strength as described above. Thus, it is possible to attach a desired number of desired articles arbitrarily using the member 40 which has been fixed in this way. This means that convenience of daily life for users and purchasers of buildings including the fragile walls 50a made of the gypsum board 50 or the like is increased dramatically by simple work of purchasing the fixing device 1 and fixing it to the wall surface 50a only.

Additionally, for builders involved in the construction of this type of building, this means that there is an added benefit of "improving the convenience of daily life" for the users and purchasers of this type of building (although some additional cost is required) by simply adding the work of installing the fixing device 1 at an appropriate location on the fragile wall surface 50a made of the gypsum board 50 or the like during interior construction. Therefore, regarding buildings including the gypsum board 50 (or similar materials) which has the property of being inexpensive but extremely structurally strong and the high heat and sound insulation properties, builders can appeal to potential customers through advertisements and promotions with the following message: Not only the problem of the gypsum board 50 (and its similar products) that "it is difficult to attach articles using screws or nails" is solved but also the property of high convenience that "you can attach as many desired articles as you like directly to the wall surface, even if you do not use any product that has been devised to enable fixation of an article to the wall surface made of gypsum board" is obtainable. This means that the convenience for builders is high as well.

Accordingly, with the fixing device 1 according to the present embodiment, there is a still further advantageous effect that high convenience can be provided not only to users and purchasers of buildings including the fragile wall surface 50a made of gypsum board 50 or the like but also to builders involved in the construction of this type of buildings.

In addition, with the fixing structure for an article attaching member according to the embodiment of the present invention, it is obvious that the same advantageous effects as those obtained by the aforementioned fixing device 1 for an article attaching member according to the embodiment of the present invention are obtainable.

(Other Embodiments)

The above-described embodiment shows an example that embodies the present invention. Thus, it goes without saying that the present invention is not limited to the said embodiment and that various modifications can be made without departing from the spirit of the present invention.

For example, the fixing device 1 according to the above-described embodiment has an approximately triangular tubular shape with a cross section of an approximately right-angled isosceles triangle as a whole, and the space S thereof has an approximately triangular prism-like shape with a cross section of a right-angled isosceles triangle. However, the present invention is not limited thereto. It is sufficient for the present invention that the fixing device 1 comprises the engagement wall 11, the first side wall 12 which is formed to be connected to the first connecting portion (the side edge corresponding to the side 11-1 in FIG. 1) of the engagement wall 11 and to intersect with the said wall 11, and the second side wall 13 which is formed to be connected to the second connecting portion (the side edge corresponding to the side 11-2 in FIG. 1) of the engagement wall 11 and to intersect with the said wall 11, and that the space S which is capable of receiving the engaged portion 41 of the article attaching member 40 is formed by the engagement wall 11 and the first and second side walls 12 and 13. The shape and size of the space S are arbitrary.

In other words, it is sufficient that the space S has a shape and size that is capable of receiving one engaged portion 41 of the article attaching member 40 and that allows the received engaged portion 41 to be engaged with the engagement wall 11. The engaged portion 41 received in the space S may or may not be engaged with both the first side wall 12 and the second side wall 13, or either one thereof. However, it is preferred that the engaged portion 41 received in the space S is not only engaged with the engagement wall 11 but also engaged with the first side wall 12 and/or the second side wall 13 compared with the case where the said engaged portion 41 is engaged only with the engagement wall 11. This is because the strength and stability for fixing the said engaged portion 41 to the wall surface 50a are increased.

Further, with the fixing device 1 according to the aforementioned embodiment, the engagement wall 11 is shaped like a right-angled isosceles triangle; however, the present invention is not limited to this. It is needless to say that the shape of the wall 11 may be arbitrary. The engagement wall 11 may be of any type as long as the corresponding engaged portion 41 of the article attaching member 40 can be engaged with the said wall 11 to hold the said member 40 on the wall surface 50a with desired strength. The shape of the engagement wall 11 can be determined taking the strength and decoration thereof into consideration. For example, the first and second side walls 12 and 13 of the engagement wall 11 may have different lengths (widths) to form a normal (not isosceles) right-angled triangular shape. The right-angled portion of the right-angled isosceles triangular shape may be cut out so that the engagement wall 11 has an isosceles trapezoidal shape, or it may have a non-isosceles trapezoidal shape. In the case where the location corresponding to the right angle 11-4 of the engagement wall 11 is cut out, there is no side wall at the location corresponding to the said right angle 11-4 and therefore, an opening also exists at the location corresponding to the said right angle 11-4 in addition to the opening formed at the location corresponding to the oblique side 11-3 of the engagement wall 11 and the opening formed on the opposite side (on the back side of the fixing device 1) to the engagement wall 11.

Furthermore, with the fixing device 1 according to the aforementioned embodiment, the shape of the portion corresponding to the oblique side 11-3 of the engagement wall 11 can also be changed as appropriate. For example, the engagement wall 11 may be formed into an approximately square or rectangular shape by combining two right triangles such that their oblique sides 11-3 face each other. Alternately, the engagement wall 11 may be formed into an approximately convex or concave fan-like shape by making the engagement wall 11 into a convex arc shape or a concave arc shape.

Furthermore, with the fixing device 1 according to the aforementioned embodiment, the shapes of the first and second side walls 12 and 13 can also be changed as appropriate. It is preferable that each of the first and second side walls 12 and 13 has the shape of a rectangular plate as shown in the aforementioned embodiment. However, the first engaging portion 14 can be formed at the end of the first side wall 12 located opposite to the engagement wall 11, and the second engaging portion 15 can be formed at the end of the second side wall 13 located opposite to the engagement wall 11. If there is no problem with the mechanical strength or durability, each of the first and second side walls 12 and 13 may have the shape of a rectangular plate that includes a through hole or holes or a void or voids or may have the shape formed by a plurality of pillars arranged linearly at intervals. It is sufficient for each of the first and second side walls 12 and 13 that the first engaging portion 14 is formed at the end of the first side wall 12 opposite to the engagement wall 11 and the second engaging portion 15 is formed at the end of the second side wall 13 opposite to the engagement wall 11, and that the function of engaging the engagement wall 11 with the wall surface 50a by way of the first and second engaging portions 14 and 15 is achieved. The shape and size of each of the first and second side walls 12 and 13 can be arbitrarily set.

Furthermore, with the fixing device 1 according to the aforementioned embodiment, the shapes of the first and second engaging portions 14 and 15 can also be changed as appropriate. It is preferable that each of the first and second engaging portions 14 and 15 is formed into a band-like shape as shown in the above-described embodiment. However, if there is no problem with mechanical strength and/or durability, each of the first and second engaging portions 14 and 15 may have any shape other than a band-like shape. The first and second side walls 12 and 13 may be respectively configured to fulfill the function of the engaging portion 14 and that of the second engaging portion 15 by integrating respectively the first and second engaging portions 14 and 15 into the first and second side walls 12 and 13. It is sufficient that the function of engaging the engagement wall 11 with the wall surface 50a by way of each of the first and second side walls 12 and 13 is achieved using the nails 20 or pins; thus, the shapes and sizes of the first and second engaging portions 14 and 15 can be set arbitrarily.

Furthermore, with the fixing device 1 according to the aforementioned embodiment, the first connecting portion and the second connecting portion are provided on two side edges (which correspond to the sides 11-1 and 11-2 in FIG. 1, respectively) of the engagement wall 11; however, the present invention is not limited to this. It is sufficient that the first connecting portion is a portion to which the first side wall 12 and the engagement wall 11 are to be connected; the shape and position of the first connecting portion are arbitrary. Therefore, the first connecting portion does not need to be one side edge of the engagement wall 11, and the first connecting portion may be located inward from the said side edge so that the said side edge of the engagement wall 11 protrudes to the outside of the first side wall 12. Similarly, it is sufficient that the second connecting portion also is a portion to which the second side wall 13 and the engagement wall 11 are to be connected; the shape and position of the second connecting portion are arbitrary. Therefore, the second connecting portion also does not need to be one side edge of the engagement wall 11, and the second connecting portion may be located inward from the said side edge so that the said side edge of the engagement wall 11 protrudes to the outside of the second side wall 13.

Furthermore, with the fixing device 1 according to the aforementioned embodiment, the engagement wall 11 has the through hole 11a through which the wood screw 30 as a coupling means is inserted; however, the through hole 11a may be omitted. In this case, for example, by disposing a suitable glue or adhesive between the engagement wall 11 and the engaged portion 41 of the article attaching member 40 as a coupling means, the engagement wall 11 and the engaged portion 41 can be connected together. Instead of the wood screw 30, a connecting nail or pin as a connecting means may be inserted into the through hole of the engagement wall 11. Moreover, if a through hole is formed in the engagement wall 11 and a small bolt is embedded in the engaged portion 41, the engagement wall 11 and the engaged portion 41 can be connected together by inserting the exposed end of the small bolt through the through hole and screwing a nut to the said exposed end. Furthermore, if small magnets are respectively placed on the engaged portion 41 and the engagement wall 11, the fixing device 1 can be connected to the engaged portion 41 by magnetic force in the state where the engaged portion 41 is received in the space S. In the case where the article attaching member 40 itself is made of iron, or at least its engaged portion 41 is made of iron, the fixing device 1 can be connected to the engaged portion 41 by magnetic force by simply embedding the aforementioned magnet in the engagement wall 11.

Furthermore, with the fixing device 1 according to the aforementioned embodiment, the article attaching member 40 is formed by a rectangular wooden plate, and the four corners thereof are respectively used as the engaged portions 41 (see FIG. 23). This is because while keeping the case where the member 40 is fixed to the wall surface 50a of the gypsum board 50 so as to partially cover the said wall surface 50a in mind, the improvement of the workability of the builder who performs the aforementioned work is taken into consideration. However, the shape, size, and material of the member 40 are all arbitrary and can be selected as necessary. For example, the member 40 of FIG. 23 may have a rectangular plate shape with chamfered four corners, as shown in FIG. 24A, and the member 40 of FIG. 23 may also have a rectangular plate shape with four rounded corners, as shown in FIG. 24B. On the other hand, it is also conceivable that the member 40 itself is used as a decoration for the wall surface 50a. In that case, the shape of the member 40 may be set to a shape to which designability (decorativeness) has been added (for example, octagonal, heart-shaped, mountain-shaped, island-shaped, etc.) while taking the installation location also into consideration.

Furthermore, although the fixing device 1 according to the aforementioned embodiment is formed using a 3D printer from synthetic resin having physical properties similar to ABS resin, the present invention is not limited to this. The fixing device 1 can also be formed from a synthetic resin other than the aforementioned resin, for example, ABS resin or a synthetic resin other than ABS resin. When producing the fixing device 1 in large quantities, it is preferable to use a known integral molding method instead of a 3D printer. It goes without saying that the fixing device 1 can be formed using a method other than the 3D printer and the integral molding method.

Furthermore, with the fixing device 1 according to the aforementioned embodiment, the article attaching member 40 to be fixed is made of wood; however, the present invention is not limited to this. It goes without saying that the article attaching member 40 may be made of any material other than wood, such as a plate-shaped material made of iron. In this case, a desired article or articles (an article or articles to be attached) can be attached to the member 40 using, for example, magnetic force. A plate-shaped material made of a synthetic resin can also be used as the article attaching member 40. In this case, a desired article or articles (an article or articles to be attached) can be attached to the member 40 using, for example, an adhesive.

Furthermore, with the fixing device 1 according to the aforementioned embodiment, the wall surface 50a made of the gypsum board 50 is explained; however, it goes without saying that the present invention is not limited this. The present invention is applicable to a wall surface made of a material other than the gypsum board 50, as long as it is difficult to attach an article or articles using screws or nails, similar to the gypsum board 50.

Furthermore, with the aforementioned embodiment, the nails 20 are used to fix the fixing device 1 to the wall surface 50a; however, the present invention is not limited to this. Pins may be used instead of the nails 20. According to the dictionary, a nail has the meaning that "a thin stick of metal, bamboo, wood, etc. with one end pointed. It is used to drive things in to join or fix things, or to hang things." (See https://dictionary.goo.ne.jp/word/%E9%87%98/). On the other hand, a pin has the meaning that "a tool for fastening things by pricking or pinching. Insect pins, tie pins, hair pins, safety pins, etc." (https://dictionary.goo.ne.jp/word/%E3%83%94%E3%83%B3/#jn-189018). Thus, both nails and pins have one thing in common: they are tools for fixing things. However, nails are understood to refer to tools that are suitable for fixing things with a certain amount of weight, and pins are understood to refer to tools that are suitable for fixing lighter things than nails. Thus, it can be said that they are different in that respect. However, the point is that it is sufficient that the fixing device 1 can be fixed to the wall surface 50a by inserting it through the guide hole 14a or 15a and pushing it into the wall surface 50a. Therefore, as long as it satisfies the above conditions, it is applicable to the present invention regardless of whether it is called a "nail" or a "pin."

INDUSTRIAL APPLICABILITY

The fixing device for an article attaching member and the article fixing structure using the same according to the present invention can be used widely in cases where attachment of various articles to fragile wall surfaces (for example, a wall surface made of gypsum board or the like), to which it is difficult to attach an article or articles using screws or nails, needs to be realized easily at a low cost.

DESCRIPTION OF REFERENCE SIGNS 1 fixing device
11 engagement wall
11a through hole
11b tapered face
11-1 side
11-2 side
11-3 oblique side
11-4 right angle
12 first side wall
12a cutout portion
13 second side wall
13a cutout portion
14 first engaging portion
14a guide hole
15 second engaging portion
15a guide hole
16 protrusion
20 nail
30 wood screw
40 article attaching member
50 gypsum board
50a wall surface
60 metal bracket
61 screw
70 rod-shaped hanger
S space

The invention claimed is:

1. A fixing device configured to be used for fixing an article attaching member, to which a desired article or articles is/are attachable, to a fragile wall surface made of gypsum board or the like, comprising:
- an engagement wall having a first connecting portion and a second connecting portion extending in mutually different directions; the engagement wall being configured to be engageable with a predetermined engaged portion of the article attaching member;
- a first side wall connected to the first connecting portion of the engagement wall so as to intersect with the engagement wall;
- a second side wall connected to the second connecting portion of the engagement wall so as to intersect with the engagement wall;
- a first engaging portion formed at an end of the first side wall on an opposite side to the engagement wall, the first engaging portion having guide holes extending in a predetermined direction, the guide holes being configured such that nails or pins are inserted through the guide holes and such that the nails or pins are guided by the guide holes; and
- a second engaging portion formed at an end of the second side wall on an opposite side to the engagement wall, the second engaging portion having guide holes extending in a predetermined direction, the guide holes being configured such that nails or pins are inserted through the guide holes and such that the nails or pins are guided by the guide holes;
- wherein on a side of the engagement wall where the first engaging portion and the second engaging portion are present, a space capable of receiving the engaged portion of the article attaching member is formed by the engagement wall, the first side wall, and the second side wall;
- a portion of the space opposite to the engagement wall and portions of the space opposite respectively to the first side wall and the second side wall are open to the outside;
- a connecting means for connecting the engaged portion and the engagement wall together in a state where the engaged portion is received in the space, wherein when fixing the article attaching member at a desired position using nails or pins, the engaged portion and the engagement wall are configured to be capable of being connected together by the connecting means;
- the first engaging portion is configured to be engaged with the wall surface by nails or pins which are inserted through the guide holes of the first engaging portion and pushed into the wall surface in a state where the first engaging portion is contact with the wall surface;
- the second engaging portion is configured to be engaged with the wall surface by inserting nails or pins which are inserted through the guide holes of the second engaging portion and pushed into the wall surface in a state where the second engaging portion is contact with the wall surface;
- when fixing the article attaching member at a desired position on the wall surface, the first engaging portion is engaged with the wall surface by nails or pins which are inserted through the guide holes of the first engaging portion and pushed into the wall surface, the second engaging portion is engaged with the wall surface by nails or pins which are inserted through the guide holes of the second engaging portion and pushed into the wall surface, and the engagement wall is engaged with the engaged portion of the article attaching member which is received in the space, thereby fixing the engaged portion of the article attaching member at the desired position;
- and when the article attaching member is fixed to the desired position on the wall surface, a back surface of the engaged portion received in the space and engaged with the engagement wall and a back surface of the portion of the article attaching member other than the engaged portion are in contact with the wall surface.

2. The fixing device according to claim 1, wherein the connecting means for connecting the engaged portion and the engagement wall together is a screw member having a male thread.

3. The fixing device according to claim 1, wherein the connecting means for connecting the engaged portion and the engagement wall together is a connecting nail or pin.

4. The fixing device according to claim 1, wherein the connecting means for connecting the engaged portion and the engagement wall together is a glue or adhesive.

5. The fixing device according to claim 1, wherein the connecting means for connecting the engaged portion and the engagement wall together is a magnet.

6. The fixing device according to claim 1, wherein the first side wall and the second side wall are connected to each other at their opposing edges, a corner portion is formed at a connection location between the first side wall and the second side wall, and the engagement wall has a plate-like shape including the corner portion; and
- the engagement wall, the first side wall, and the second side wall are configured to be engageable with the engaged portion in a state where the engaged portion is received in the space.

7. The fixing device according to claim 1, wherein the first side wall and the second side wall are connected to each other at their opposing edges, a corner portion is formed at a connection location between the first side wall and the second side wall, and the engagement wall has a plate-like shape including the corner portion; and
- when the engaged portion is received in the space, the engaged portion is held on the wall surface such that the engagement wall is in surface contact with the engaged portion.

8. The fixing device according to claim 1, wherein the first engaging portion has a band-like shape formed along the first side wall at the end of the first side wall on the opposite side to the engagement wall;
- the guide holes of the first engaging portion are arranged at intervals along the first side wall;
- the second engaging portion has a band-like shape formed along the second side wall at the end of the second side wall on the opposite side to the engagement wall; and
- the guide holes of the second engaging portion are arranged at intervals along the second side wall.

9. The fixing device according to claim 1, wherein the guide holes of the first engaging portion are configured to be inclined toward inside of the first side wall such that, and tips of nails or pins which are respectively inserted in their entirety through the guide holes of the first engaging portion are located in the inside of the first side wall; and
- the guide holes of the second engaging portion are configured to be inclined toward inside of the second side wall such that tips of nails or pins which are respectively inserted in their entirety through the guide holes of the second engaging portion are located in the inside of the second side wall.

10. A fixing structure for an article attaching member, comprising:
- at least one fixing device for an article attaching member according to claim 1 which is fixed on a fragile wall surface made of gypsum board or the like;
- wherein in each of the fixing devices,
- the first engaging portion, which is in contact with the wall surface, is engaged with the wall surface by nails or pins which are inserted respectively through the guide holes of the first engaging portion and pushed into the wall surface;
- the second engaging portion, which is in contact with the wall surface, is engaged with the wall surface by nails or pins which are inserted respectively through the guide holes of the second engaging portion and pushed into the wall surface;
- the engagement wall is engaged with a corresponding one of the engaged portions of the article attaching member that is received in the space, whereby the article attaching member is fixed at the desired position on the wall surface and a back surface of the engaged portion received in the space and engaged with the engagement wall and
- a back surface of the portion of the article attaching member other than the engaged portion are in contact with the wall surface.

11. The fixing structure according to claim 10, wherein the article attaching member is a plate-like member made of wood, iron, or synthetic resin.

* * * * *